(12) United States Patent
Ikeda et al.

(10) Patent No.: US 8,260,003 B2
(45) Date of Patent: Sep. 4, 2012

(54) IMAGE-SIGNAL PROCESSOR, IMAGE-SIGNAL PROCESSING METHOD, AND PROGRAM FOR TRACKING A MOVING OBJECT

(75) Inventors: Masaru Ikeda, Kanagawa (JP); Tetsujiro Kondo, Tokyo (JP); Tomoyuki Otsuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 847 days.

(21) Appl. No.: 12/402,062

(22) Filed: Mar. 11, 2009

(65) Prior Publication Data

US 2009/0238408 A1 Sep. 24, 2009

(30) Foreign Application Priority Data

Mar. 18, 2008 (JP) ................. 2008-068809

(51) Int. Cl.
*G06K 9/00* (2006.01)
(52) U.S. Cl. ...................................................... 382/107
(58) Field of Classification Search .......... 382/100–107; 73/488–490; 348/154–156; 356/27–29
See application file for complete search history.

(56) References Cited

U.S. PATENT DOCUMENTS

| | | |
|---|---|---|
| 5,719,636 A | 2/1998 | Ishii et al. |
| 5,973,749 A | 10/1999 | Ishii et al. |
| 2004/0101058 A1* | 5/2004 | Sasai et al. ............... 375/240.26 |
| 2006/0269103 A1 | 11/2006 | Brown et al. |

FOREIGN PATENT DOCUMENTS

| | | |
|---|---|---|
| EP | 0 800 311 A1 | 10/1997 |
| EP | 1 422 928 A2 | 5/2004 |
| JP | 7-298200 | 11/1995 |
| JP | 8-123784 | 5/1996 |
| JP | 9-270966 | 10/1997 |
| JP | 11-110180 | 4/1999 |
| WO | WO 01/60054 A1 | 8/2001 |

OTHER PUBLICATIONS

European Office Action issued Apr. 14, 2011, in Patent Application No. 09155095.4.

Sung-Hee Lee, et al., "Motion Vector Correction Based on the Pattern-Like Image Analysis", IEEE Transactions on Consumer Electronics, vol. 49, No. 3, XP 1172086, Aug. 1, 2003, pp. 479-484.

* cited by examiner

*Primary Examiner* — Atiba O Fitzpatrick
(74) *Attorney, Agent, or Firm* — Oblon, Spivak, McClelland, Maier & Neustadt, L.L.P.

(57) ABSTRACT

An image-signal processing apparatus configured to track an object moving in an image includes a setting unit configured to set an eliminating area in an image constituting a moving image; a motion-vector detecting unit configured to detect an object in the image constituting a moving image and detect a motion vector corresponding to the object using an area excluding the eliminating area in the image; and an estimating unit configured to estimate a position to which the object moves on the basis of the detected motion vector.

11 Claims, 20 Drawing Sheets

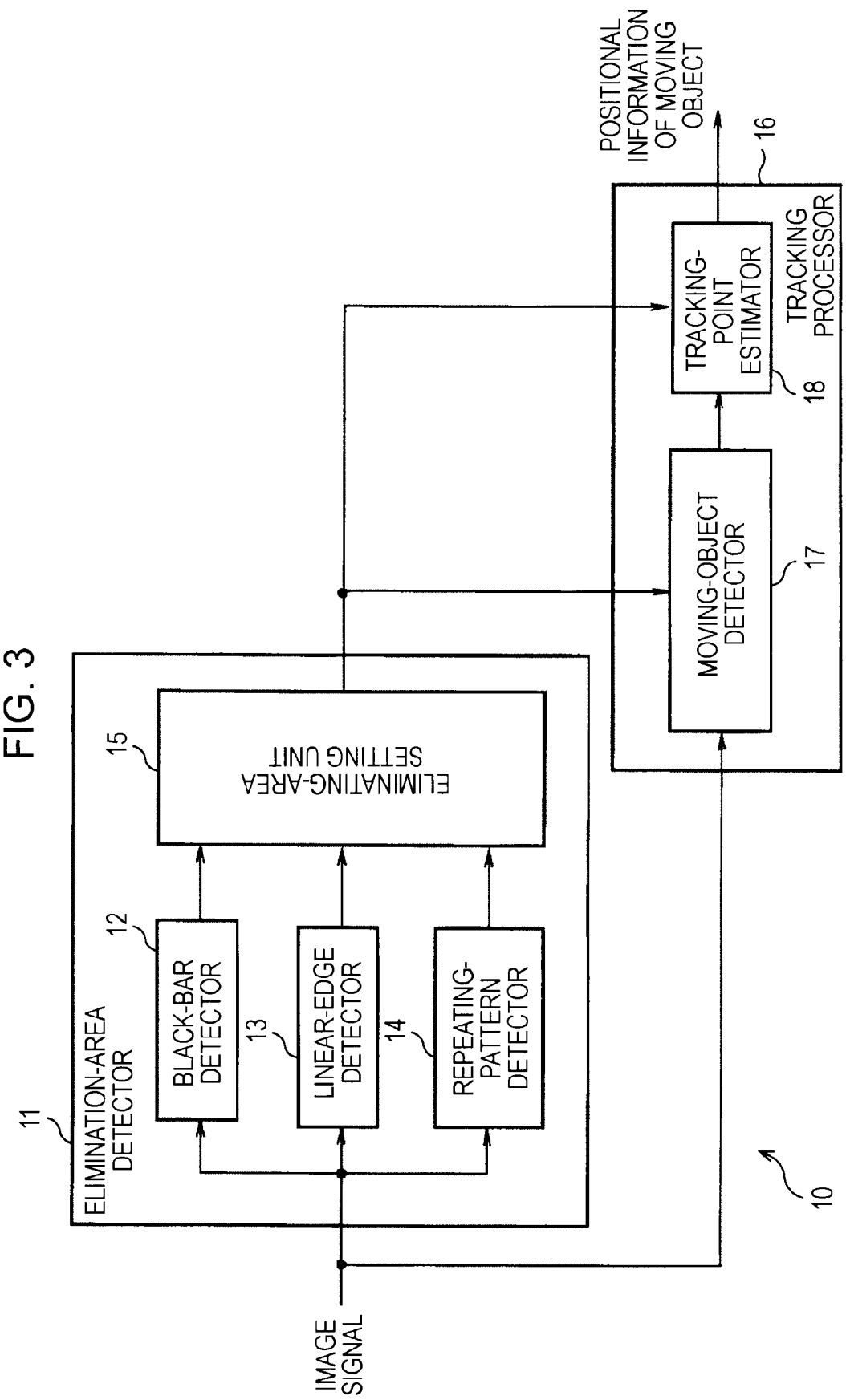

FIG. 21
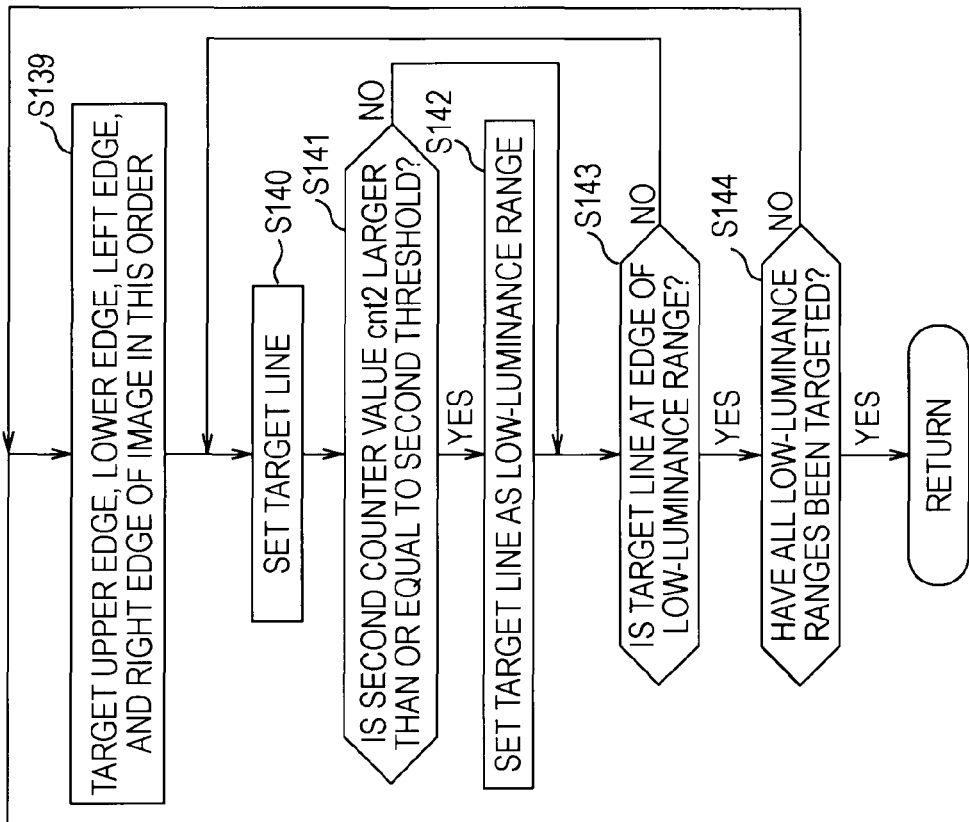
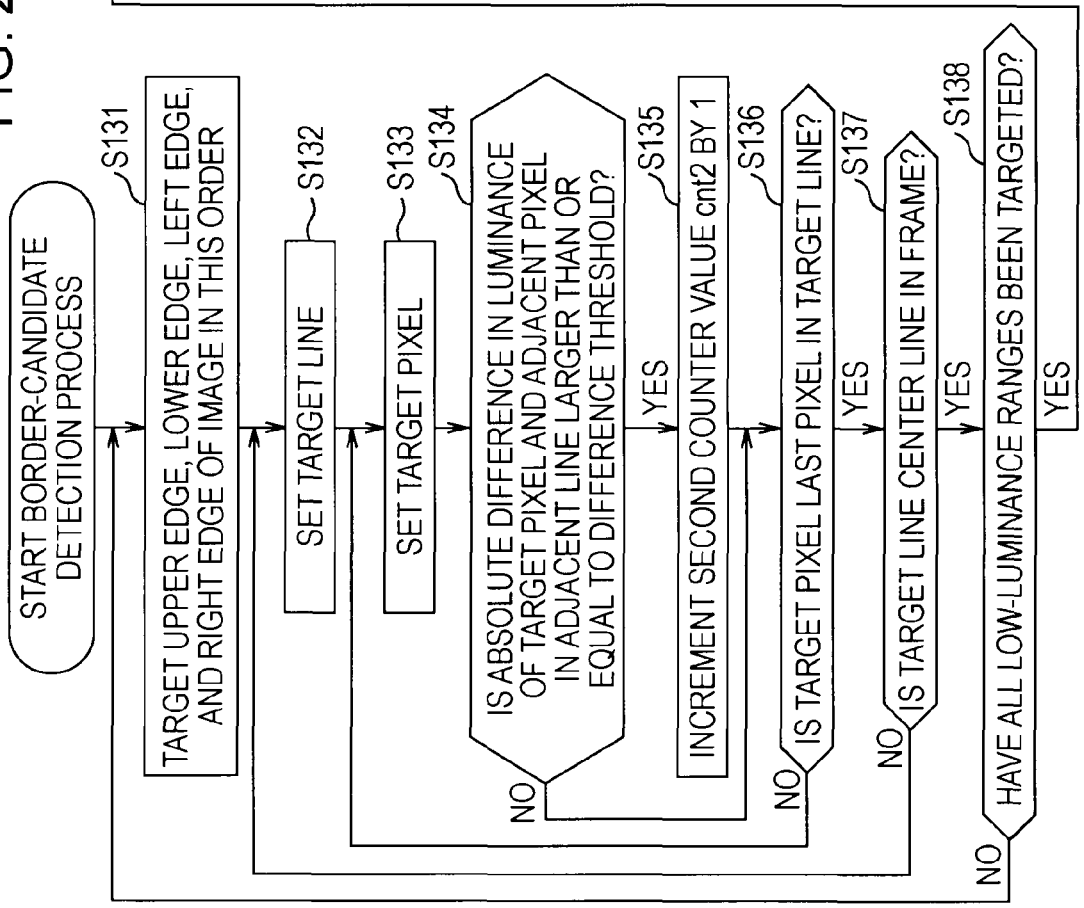

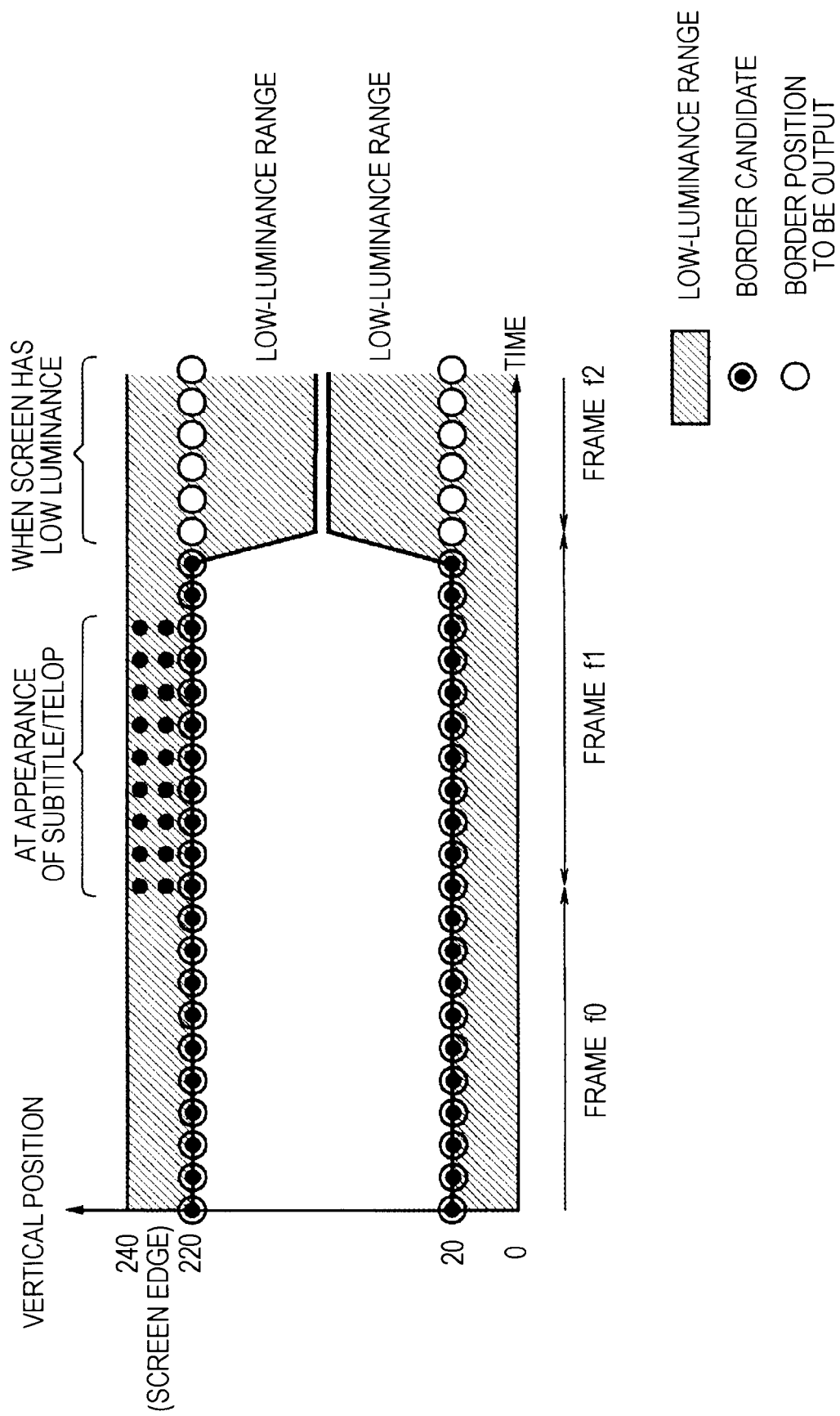

FIG. 25

| TIME (FRAME) | 0 | 1 | 2 | 3 | 4 | 5 | 6 | 7 | 8 | 9 | 10 | 11 |
|---|---|---|---|---|---|---|---|---|---|---|---|---|
| UPPER LIMIT OF DETECTED LOW-LUMINANCE RANGE | 20 | 20 | 20 | 20 | 20 | 20 | 20 | 20 | 20 | 20 | 20 | 20 |
| DETECTED BORDER POSITION | 20 | 20 | 20 | 20 | 20 | 20 | 20 | 20 | 20 | 20 | 20 | 20 |
| THIRD COUNTER VALUE | 0 | 1 | 2 | 3 | 4 | 5 | 6 | 7 | 7 | 7 | 7 | 7 |
| OUTPUT BORDER POSITION | 0 | 0 | 0 | 0 | 0 | 0 | 0 | 20 | 20 | 20 | 20 | 20 |

FIG. 26

| TIME (FRAME) | 100 | 101 | 102 | 103 | 104 | 105 | 106 | 107 | 108 | 109 | 110 | 111 |
|---|---|---|---|---|---|---|---|---|---|---|---|---|
| UPPER LIMIT OF DETECTED LOW-LUMINANCE RANGE | 20 | 20 | 20 | 119 | 119 | 119 | 119 | 119 | 119 | 119 | 119 | 119 |
| DETECTED BORDER POSITION | 20 | 20 | 20 | NONE | NONE | NONE | NONE | NONE | NONE | NONE | NONE | NONE |
| THIRD COUNTER VALUE | 7 | 7 | 7 | 7 | 7 | 7 | 7 | 7 | 7 | 7 | 7 | 7 |
| OUTPUT BORDER POSITION | 20 | 20 | 20 | 20 | 20 | 20 | 20 | 20 | 20 | 20 | 20 | 20 |

FIG. 27

| TIME (FRAME) | 200 | 201 | 202 | 203 | 204 | 205 | 206 | 207 | 208 | 209 | 210 | 211 |
|---|---|---|---|---|---|---|---|---|---|---|---|---|
| UPPER LIMIT OF DETECTED LOW-LUMINANCE RANGE | 20 | 20 | 20 | 0 | 0 | 0 | 0 | 0 | 0 | 0 | 0 | 0 |
| DETECTED BORDER POSITION | 20 | 20 | 20 | NONE | NONE | NONE | NONE | NONE | NONE | NONE | NONE | NONE |
| THIRD COUNTER VALUE | 7 | 7 | 7 | 0 | 1 | 2 | 3 | 4 | 5 | 6 | 7 | 7 |
| OUTPUT BORDER POSITION | 20 | 20 | 20 | 20 | 20 | 20 | 20 | 20 | 20 | 20 | 0 | 0 |

IMAGE-SIGNAL PROCESSOR, IMAGE-SIGNAL PROCESSING METHOD, AND PROGRAM FOR TRACKING A MOVING OBJECT

BACKGROUND OF THE INVENTION

1. Field of the Invention

The present invention relates to an image-signal processing apparatus, an image-signal processing method, and a program and, more specifically, relates to an image-signal processing apparatus, an image-signal processing method, and a program suitably used for tracking an object moving in an image.

2. Description of the Related Art

For example, when carrying out image processing, such as detecting and tracking a suspicious individual in an image captured by a security camera and then performing noise cancelling, analyzing a trajectory of a certain soccer player in an image of a soccer game, or tracking and trimming your own child in an image of a sports festival, a process of tracking an object (such as, the suspicious individual, the soccer play, or the child) in time-sequential images constituting a moving image is carried out.

To track an object moving in an image according to the related art, there are methods such as setting a moving image as a tracking target and tracking a tracking point set on the tracking target and estimating an area in which the tracking target is included and carrying out tracking in units of such area. In either method, motion vectors of points and areas in the image are detected.

A typical method for detecting a motion vector in an image is a block matching method. In the block matching method, an image block (hereinafter referred to as "matching area") having a predetermined size (horizontal pixels×vertical pixels) is provided in one of two images consecutive in time, and a search area larger than the matching area is provided in the other image. Then, the total absolute difference of the pixel values in the matching area and the search area is calculated as an evaluated value. A position where the evaluated value is minimized is determined to be the destination of the matching area, and a motion vector of the block area is detected.

When black bars exist in an image, there are the following inconveniences in using the block matching method.

For example, as shown in FIG. 1, when a matching area is provided near a black bar, the calculated evaluated value does not change very much even when moved in the horizontal direction, as shown in FIG. 2, and thus it is difficult to determine the position where the evaluated value is minimized. Therefore, there is high possibility of not being able to detect an accurate motion vector. If an accurate motion vector is not detected, the detected motion vectors will be discontinuous over time.

Therefore, so long as the tracking of moving object is based on an inaccurate motion vector not having continuity over time, it is difficult to accurately track the moving object.

Accordingly, black bars in the image can be detected, and then detection of a motion vector by block matching can be avoided near the detected black bars.

As a method of detecting black bars in an image, there is a method in which a border position between a black bar and an actual image is detected in each frame of an image signal on the basis of, for example, a low-luminance level or a difference between adjacent pixels and the continuity over time of the detected border position is identified (for example, refer to Japanese Unexamined Patent Application Publication No. 9-270966) and in which a black bar is detected on the presumption that the black bar exist within a certain line period from the screen edge (for example, refer to Japanese Unexamined Patent Application Publication No. 7-298200).

SUMMARY OF THE INVENTION

According to the method described in Japanese Unexamined Patent Application Publication No. 9-270966, when the luminance of the black bar is not sufficiently low, when subtitles and telops are included in the black bar, and/or when the luminance of the entire screen becomes low in the middle of a scene, the border position of the black bar in each frame may be falsely detected. As a result, the identification of continuity over time of the position of the black bar may be affected, and thus the detected result of the final position of the black bar may be affected.

According to the Japanese Unexamined Patent Application Publication No. 7-298200, depending on the image to be processed, the detected result may be affected by the set value in the predetermined line period.

In this way, when a black bar is not detected accurately, the black bar is not accurately eliminated from the area where block matching is performed, and thus a motion vector is not detected accurately. Therefore, it is difficult to accurately track a moving object.

The present invention has been conceived in response to such situation and enables accurate tracking of an object moving in an image.

An image-signal processing apparatus according to an embodiment of present invention, configured to track an object moving in an image, includes setting means for setting an eliminating area in an image constituting a moving image; motion-vector detecting means for detecting an object in the image constituting a moving image and detecting a motion vector corresponding to the object using an area excluding the eliminating area in the image; and estimating means for estimating a position to which the object moves on the basis of the detected motion vector.

The motion-vector detecting means may detect the object from the area excluding the eliminating area in the image constituting a moving image and may detect the motion vector corresponding to the object using the area excluding the eliminating area in the image.

The estimating means may estimate the position to which the object moves on the basis of the detected motion vector in the area excluding the eliminating area.

The setting means may include black-bar detecting means for detecting a black bar in the image constituting a moving image and eliminating-area determining means for determining the eliminating area on the basis of the detected black bar.

The black-bar detecting means may include first detecting means for detecting a low-luminance range in the image, second detecting means for detecting a border candidate of the black bar in the detected low-luminance range, and identifying means for identifying a border of the black bar on the basis of the detected low-luminance range and the detected border candidate.

An image-signal processing method, according to an embodiment of the present invention, for an image-signal processing apparatus configured to track an object moving in an image, the method include the steps of: setting an eliminating area in an image constituting a moving image; detecting an object in the image constituting a moving image and detecting a motion vector corresponding to the object using an area excluding the eliminating area in the image; and estimating a position to which the object moves on the basis of the detected motion vector.

A program, according to an embodiment of the present invention, for controlling an image-signal processing apparatus configured to track an object moving in an image executed by a computer in the image-signal processing apparatus, may include the steps of setting an eliminating area in an image constituting a moving image; detecting an object in the image constituting a moving image and detecting a motion vector corresponding to the object using an area excluding the eliminating area in the image; and estimating a position to which the object moves on the basis of the detected motion vector.

According to an embodiment of the present invention, an eliminating area in an image constituting a moving image is set; an object in the image constituting a moving image is detected; and a motion vector corresponding to the object is detected using an area excluding the eliminating area in the image. Then, a position to which the object moves is estimated on the basis of the detected motion vector.

According to an embodiment of the present invention, an object moving in an image can be tracked accurately.

BRIEF DESCRIPTION OF THE DRAWINGS

FIG. 3 is a block diagram illustrating an exemplary configuration of an object tracking device according to an embodiment of the present invention.

FIG. 21 is a flow chart illustrating in detail Step in FIG. 19.

FIG. 24 illustrates a black-bar detection process.

FIG. 25 illustrates an output in response to the black-bar detection process.

FIG. 26 illustrates an output in response to the black-bar detection process.

FIG. 27 illustrates an output in response to the black-bar detection process.

DESCRIPTION OF THE PREFERRED EMBODIMENTS

Figure 1:
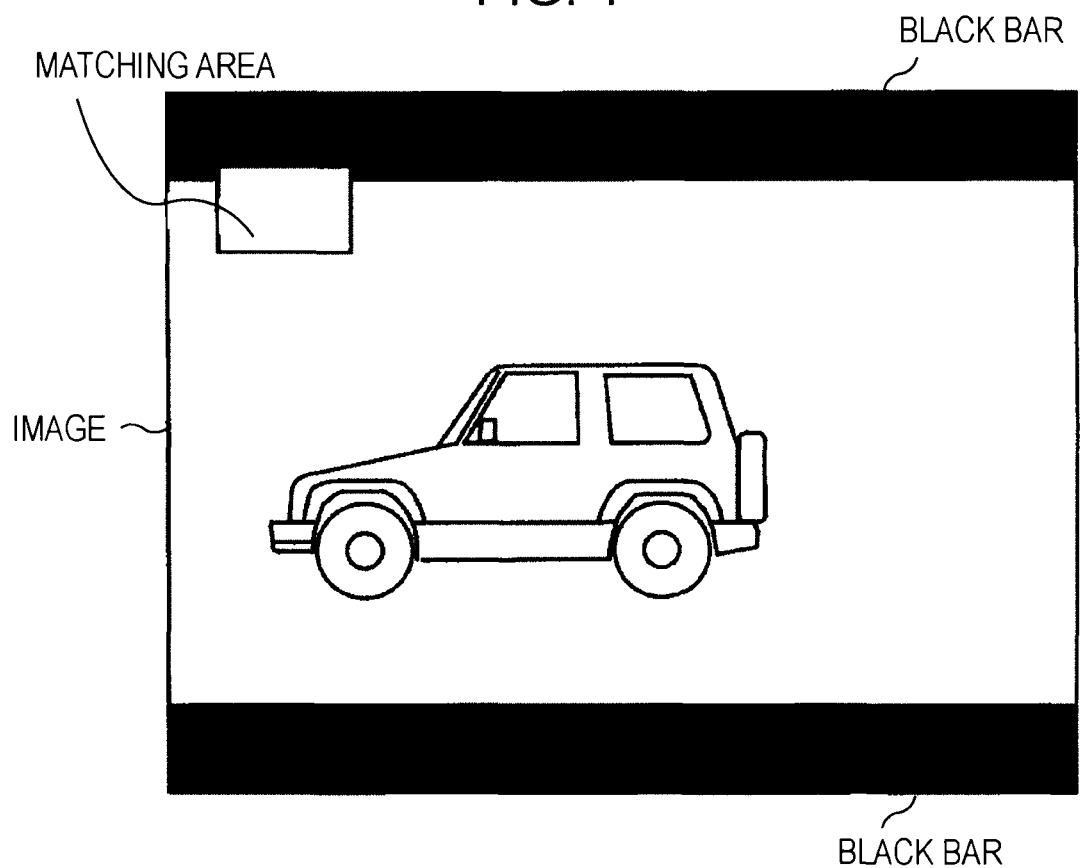
FIG. 1 illustrates the effect of black bars on a matching area set for motion-vector detection.
Figure 2:
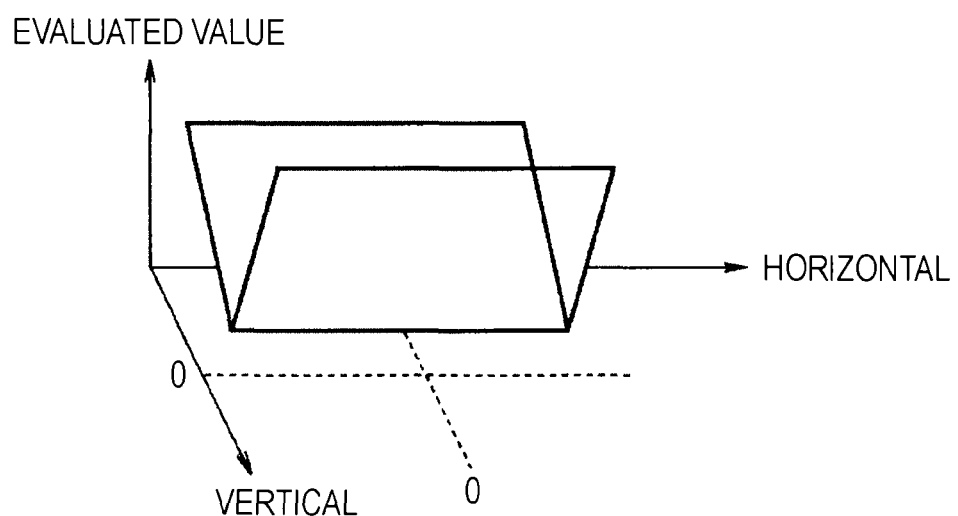
FIG. 2 illustrates the effect of a black bar on a matching area set for motion-vector detection.

Details of the embodiments according to the present invention will be described with reference to the drawings.

FIG. 3 illustrates an exemplary configuration of an object tacking device according to an embodiment of the present invention. This object tracking device 10 detects an object moving within an image of an input image signal (moving image) and tracks the detected object. The object tracking device 10 may be included in an image processor for performing image processing such as detecting and tracking a suspicious individual in an image captured with a security camera and removing noise, analyzing a trajectory of a specific player in an image of, for example, a soccer game, and tracking and trimming a specific child in an image of a school athletic meet.

As shown in FIG. 3, the object tracking device 10 includes an eliminating-area detector 11 configured to detect an area eliminated from a processing range (hereinafter, referred to as "eliminating area") in which processing such as object detection in the image is to be carried out; and a tracking processor 16 configured to specify an object to be tracked by detecting movement in the image and track the specific object.

The eliminating-area detector 11 includes a black-bar detector 12 configured to detect black bars in the image; a linear-edge detector 13 configured to detect linear edges in the image; a repeating-pattern detector 14 configured to detect a repeating pattern in the image; and an eliminating-area setting unit 15 configured to set an eliminating area on the basis of the detected black bars, linear edges, and repeating patterns.

Figure 4A:
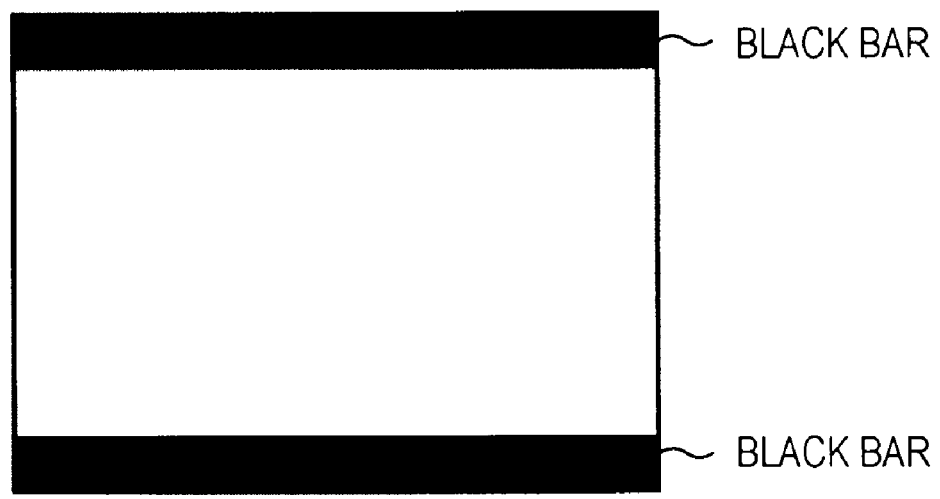
FIGS. 4A and 4B illustrate black bars in a screen of an image signal.
Figure 4B:
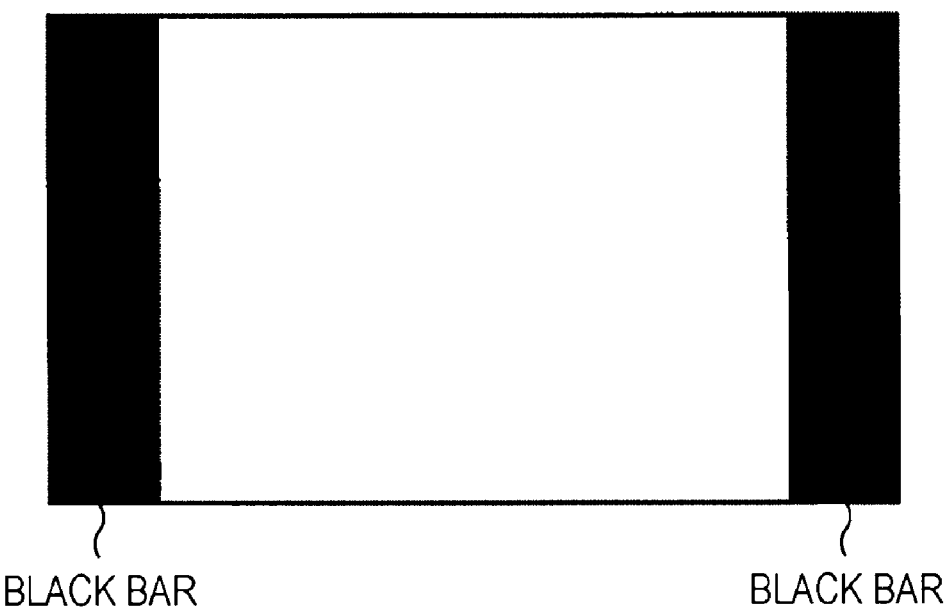

The black-bar detector 12 detects black bars added to the top and bottom of the actual image, as shown in FIG. 4A, or black bars provided at the left and right of the actual image, as shown in FIG. 4B. Then, the black-bar detector 12 sends the positions of the borders of the detected black bars and the actual image (hereinafter simply referred to as "borders").

Figure 5:
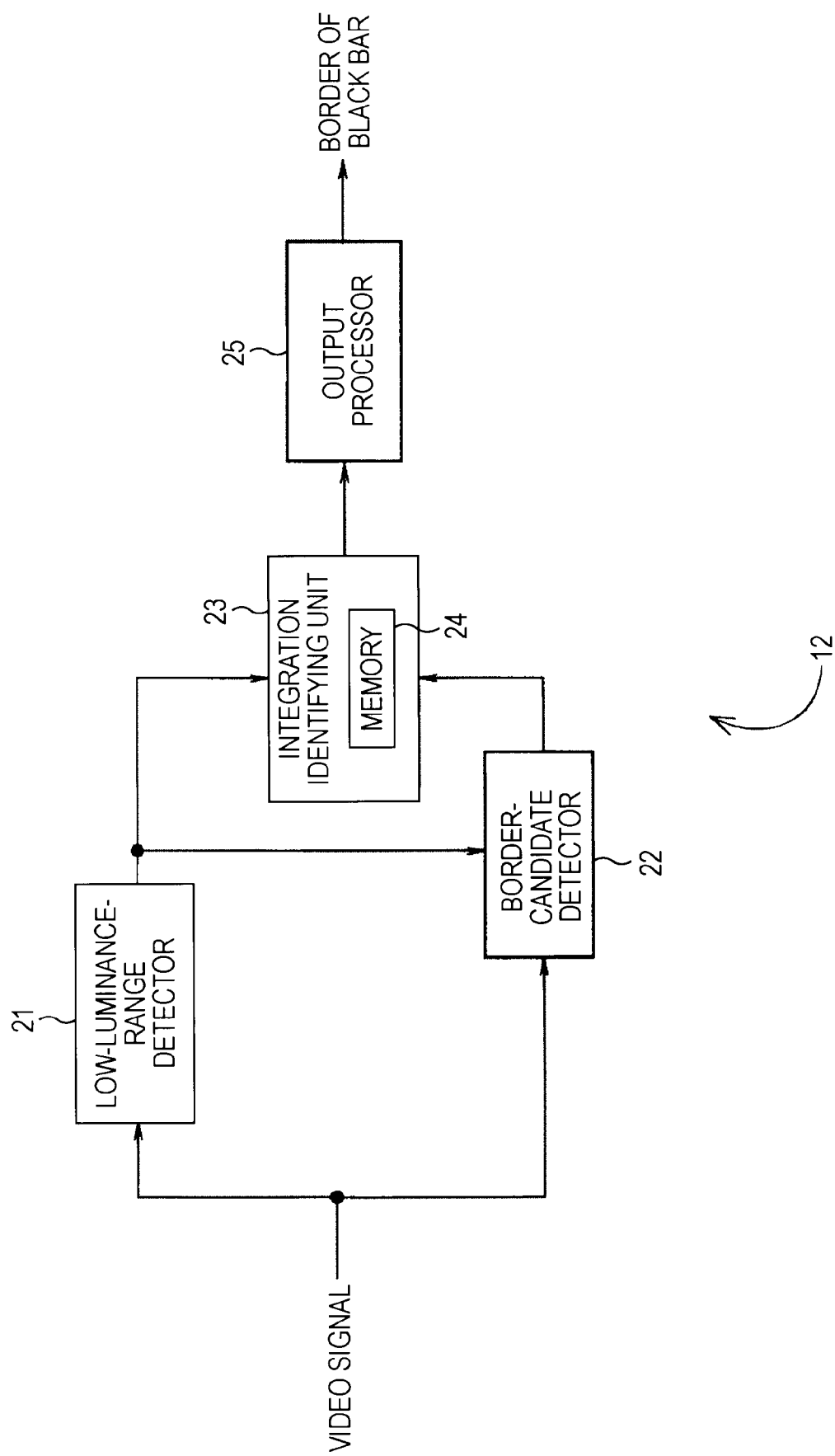
FIG. 5 is a block diagram of an exemplary configuration of a black-bar detector shown in FIG. 3.

FIG. 5 illustrates the detailed configuration of the black-bar detector 12. The black-bar detector 12 includes a low-luminance-range detector 21 configured to detect a range in which the luminance of the pixels is low in each frame of the image signal (low-luminance range); a border-candidate detector 22 configured to detect a candidate of a border in the detected low-luminance range; an integration identifying unit 23 configured to identify the position of the border in each frame on the basis of the detected low-luminance range and border candidate; and an output processor 25 configured to supply the position of the border in each frame to a unit downstream on the basis of the continuity over time of the result of the identification.

Figure 6:
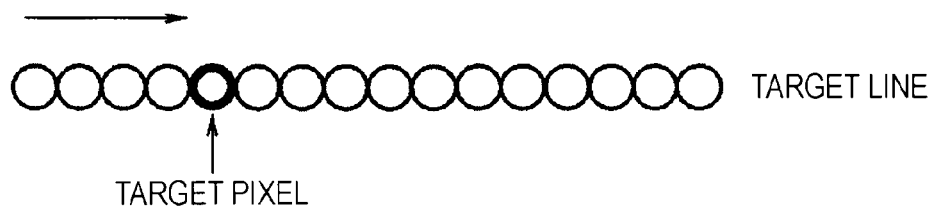
FIG. 6 illustrates the operation of a low-luminance-range detector shown in FIG. 5.

The low-luminance-range detector 21 sequentially processes frames of an image signal input from an upstream unit, sets a target line, one by one, from the edge (upper, lower, left, or right) of the frame to be processed, and sets a target pixel, one by one, on the target line, as shown in FIG. 6. Then, the low-luminance-range detector 21 determines whether or not the luminance of the target pixel is lower than or equal to a predetermined luminance threshold. When the number of pixels having luminance that is lower than equal to the threshold is larger than equal to a first threshold, the target line is determined to be in the low-luminance range, and a low-luminance flag is set to "1" in the target line.

Since the pixel number of the longitudinal line of each frame is different from the pixel number of the lateral line, the first threshold is set to a different value when the target line is at the top and bottom of the image and when the target line is at the left and right of the image.

Figure 7:
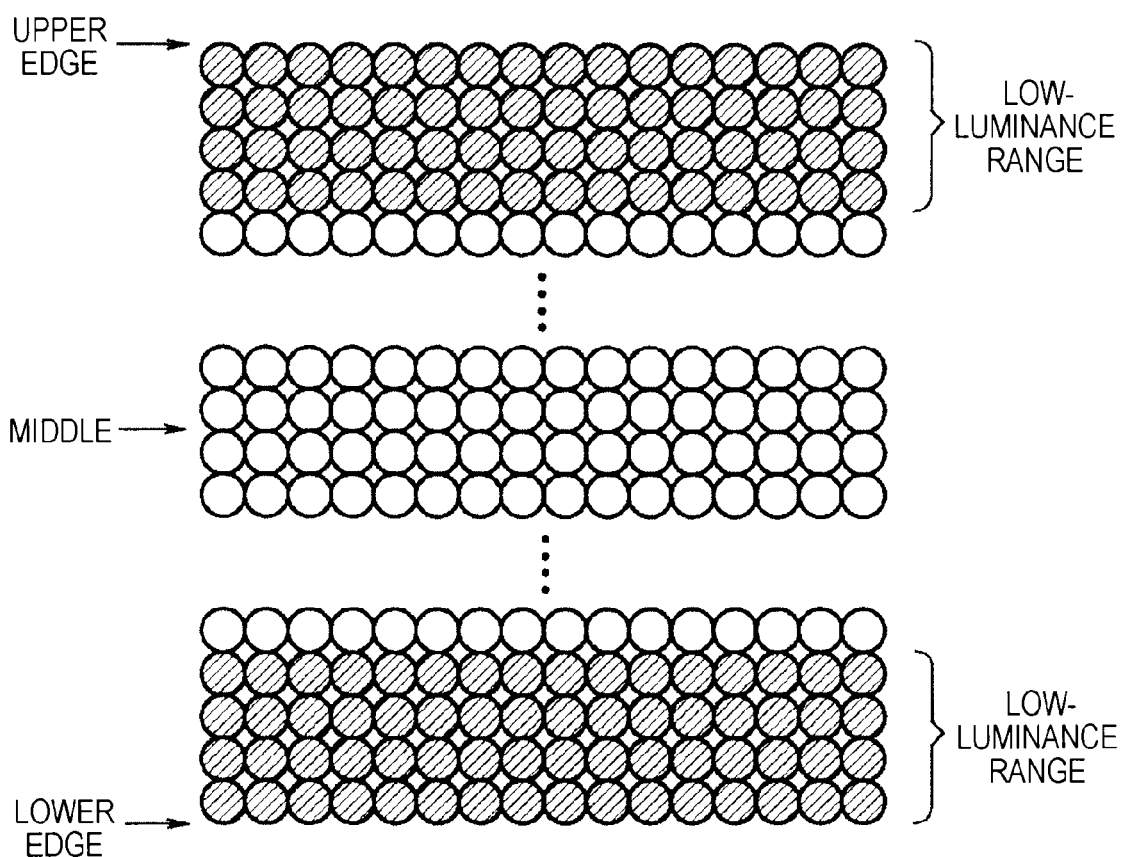
FIG. 7 illustrates the operation of a low-luminance-range detector shown in FIG. 5.

In this way, through determining whether or not the target lines in each frame are included in a low-luminance range, low-luminance range is detected at the edges of each frame, as shown in FIG. 7. FIG. 7 illustrates an example in which low-luminance ranges are detected at the upper and lower edges of a frame. Low-luminance ranges are not detected in a frame that does not include black bars.

Figure 8:
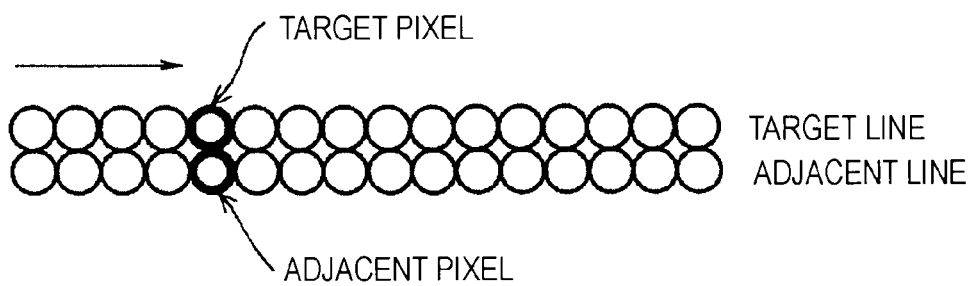
FIG. 8 illustrates the operation of a border-candidate detector shown in FIG. 5.

The border-candidate detector 22 sequentially processes frames of the image signal input from an upstream unit and sequentially sets a line target line, one by one, in the low-luminance range detected at the edge (upper, lower, left, or right) of the frame to be processed by the low-luminance-range detector 21 and sets the line adjacent to the target line (the subsequent target line) as an "adjacent line". As shown in FIG. 8, pixels on the target line are sequentially set as target pixels. Then, the absolute difference of the luminance of a target pixel and an adjacent pixel in the adjacent line is calculated to determine whether or not the difference is larger than or equal to a predetermined difference threshold. When the number of pixels having an absolute difference of the luminance is larger than or equal to a predetermined second threshold, the target line is determined to be a border candidate.

Figure 9:
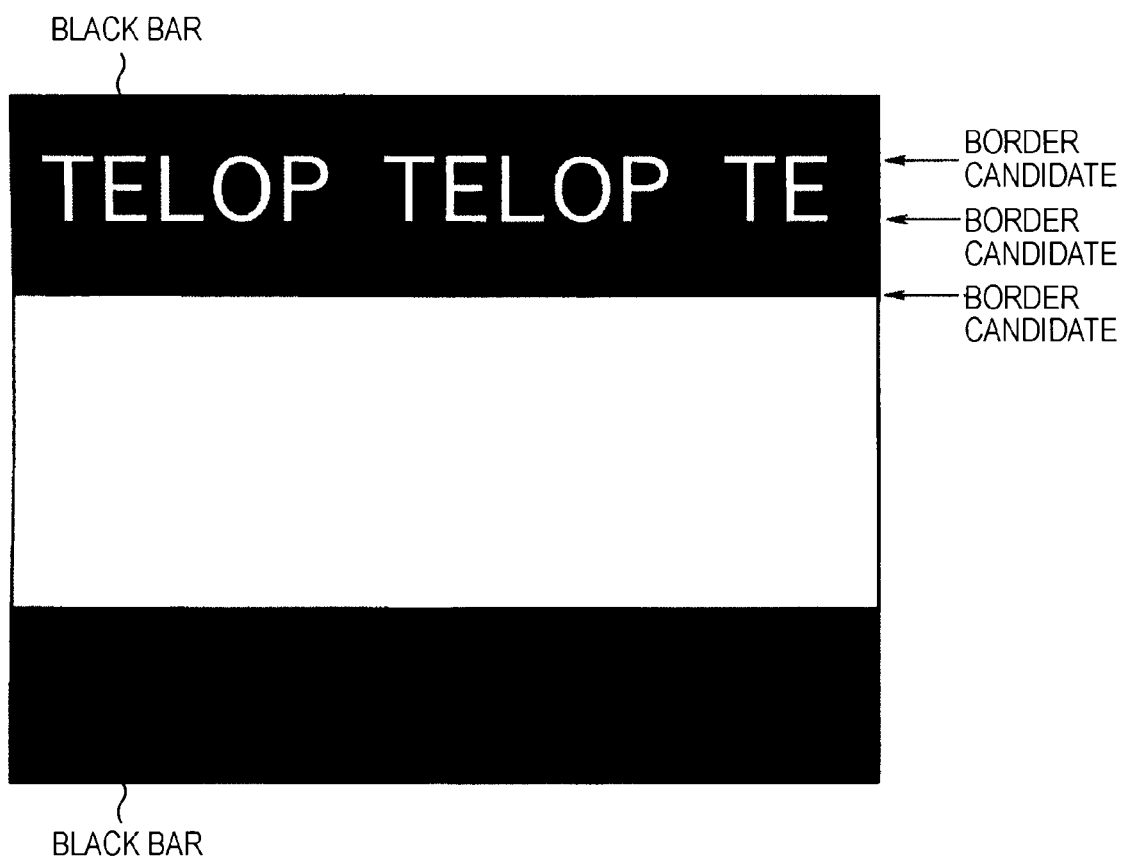
FIG. 9 illustrates exemplary border candidates.

In this way, by determining a border candidate, the border can be detected even when subtitles and telops are displayed in the black bars, as shown in FIG. 9, without detecting the edges of the subtitles and telops as a border candidate of the black bar (without falsely detecting the border).

The integration identifying unit 23 identifies the positions of the borders in each frame on the basis of the low-luminance range detected by the low-luminance-range detector 21 and the border candidate detected by the border-candidate detector 22 and identifies the continuity over time of the positions of the borders. More specifically, a combination of border candidates at the upper and lower edges or the left and right edges of the frame in which the thicknesses of the black bars are substantially the same is detected, and the continuity over time of the detected combination of border candidates is counted as the number of frames. The integration identifying unit 23 has a memory 24 configured to hold the counted values and the position of the borders in the previous frame.

The output processor 25 determines the positions of the borders in each frame on the basis of the continuity over time of the border positions identified by the integration identifying unit 23 and notifies the eliminating-area setting unit 15. When appropriate, the output processor 25 refers to information in the memory 24 in the integration identifying unit 23.

Figure 10:
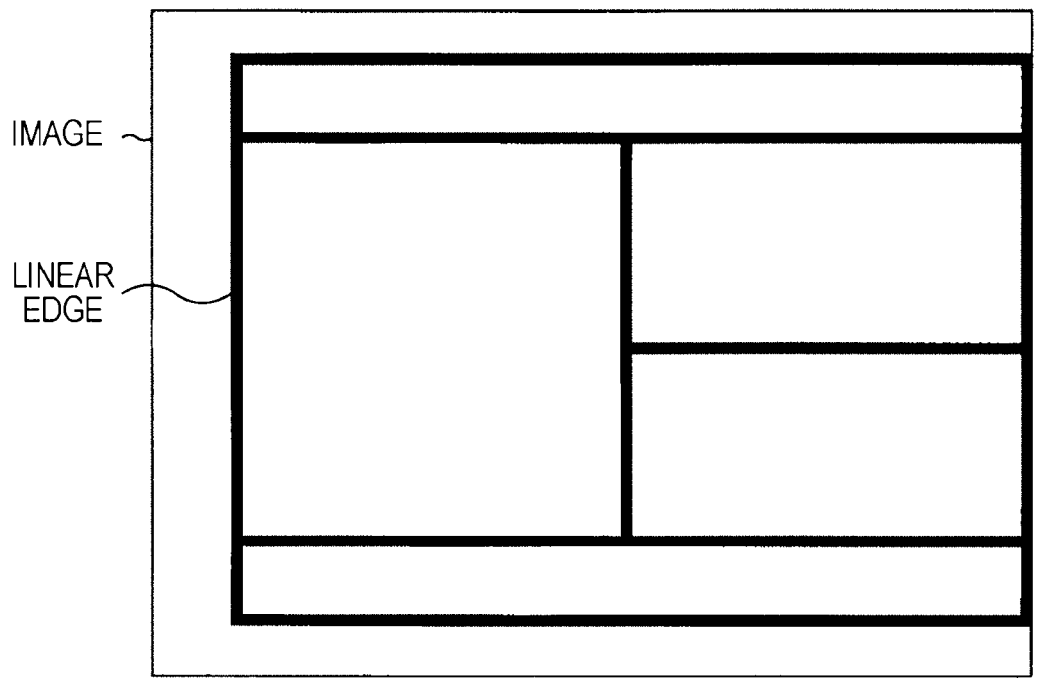
FIG. 10 illustrates exemplary linear edges displayed on a screen of an image signal.
Figure 11:
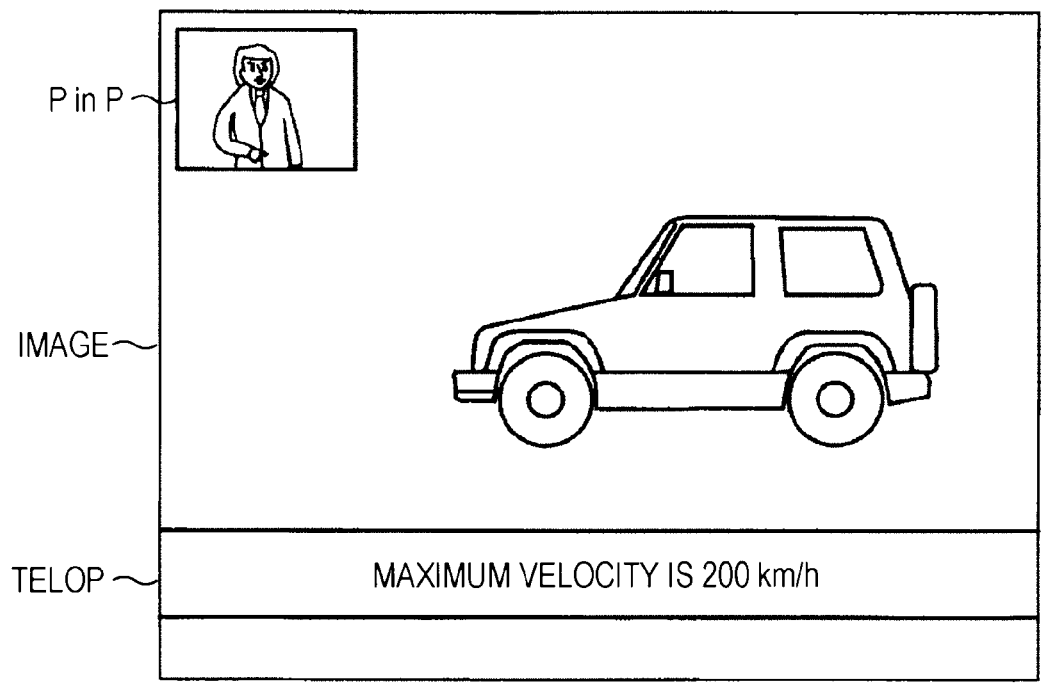
FIG. 11 illustrates an exemplary PinP and an exemplary telop detected as linear edges.

Referring back to FIG. 3, the linear-edge detector 13 employs a method according to the related art to detect linear edges in the image and sends positional information about the detected linear edges to the eliminating-area setting unit 15. The detected linear edges may be straight lines in an image, such as the image (an image of a tennis court) shown in FIG. 10, the outline of a picture in picture (PinP) and the frame of a telop (subtitle), such as those shown in FIG. 11), or an on screen display (OSD) (not shown).

The repeating-pattern detector 14 employs a method according to the related art to detect linear edges in the image and sends positional information about a detected repeating pattern to the eliminating-area setting unit 15.

The eliminating-area setting unit 15 sets an eliminating area based on the positional information about (the borders of) the black bars sent from the black-bar detector 12, the position information about the linear edges sent from the linear-edge detector 13, and the positional information about the repeating pattern sent from the repeating-pattern detector 14. Then, the eliminating-area setting unit 15 sends the eliminating area to the moving-object detector 17 and the tracking-point estimator 18 of the tracking processor 16.

Figure 12:
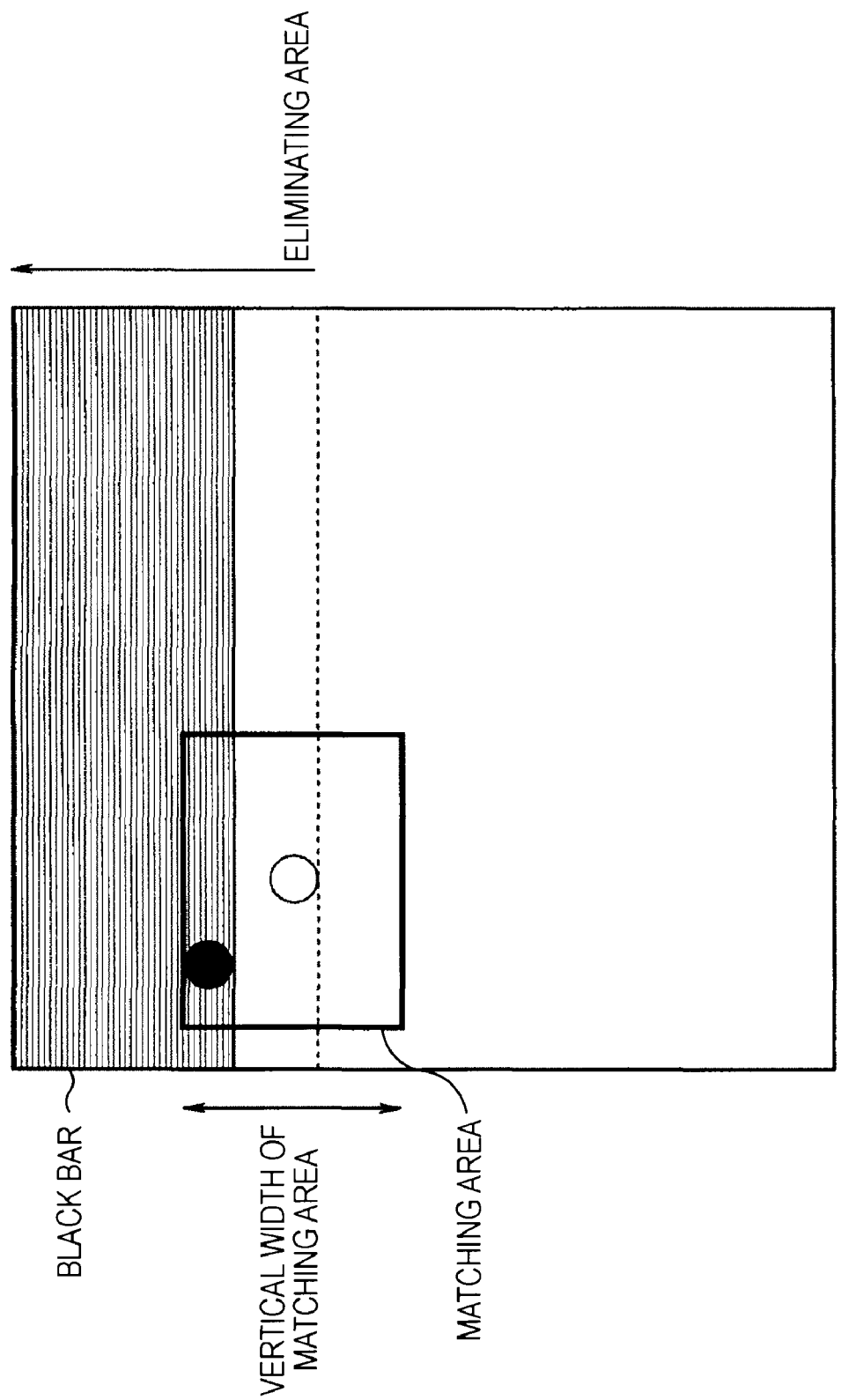
FIG. 12 illustrates an eliminating area set to correspond to black bars at the top and bottom of an image.

For the positional information of black bars, as shown in FIG. 12, when black bars are detected at the top and bottom of the image (the drawing shows only the upper black bar), an eliminating area (the area above the dotted line in the drawing) is set to an area where the center pixel (represented by a white circle in the drawing) of the matching area may exist when a pixel associated with the black bar (represented by black circles in the drawing) is included in the matching area on the basis of the vertical width of the matching area set when a motion vector is detected by the tracking processor 16.

Figure 13:
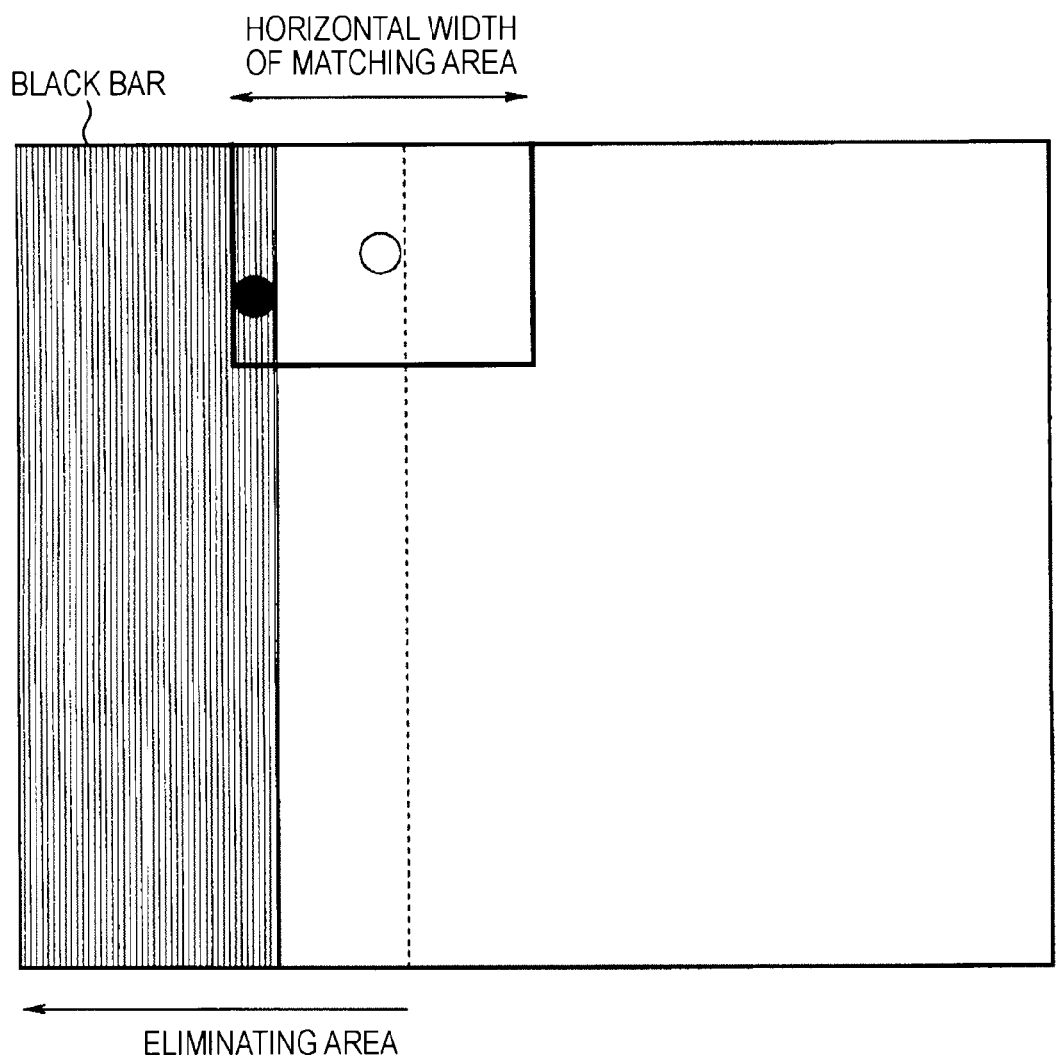
FIG. 13 illustrates an eliminating area set to correspond to black bars at the left and right of an image.

For example, as shown in FIG. 13, when black bars are detected at the left and right of the image (the drawing shows only the left black bar), an eliminating area (the area left to the dotted line in the drawing) is set to an area where the center pixel (represented by a white circle in the drawing) of the matching area may exist when a pixel associated with the black bar (represented by black circles in the drawing) is included in the matching area on the basis of the horizontal width of the matching area set when a motion vector is detected by the tracking processor 16.

Figure 14A:
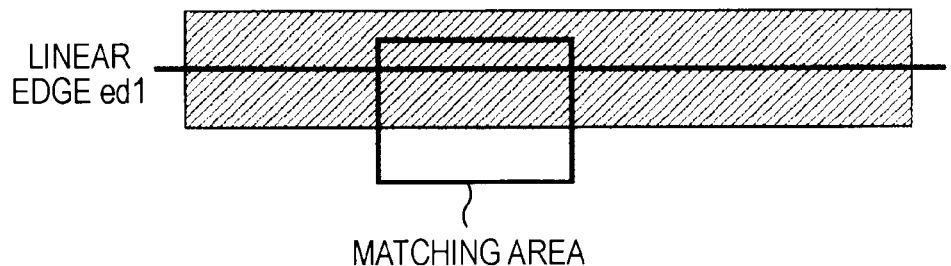
FIGS. 14A to 14D illustrate eliminating areas set to correspond to linear edges.

For example, as shown in FIG. 14A, as the positional information of linear edges, when a horizontal linear edge ed1 is detected in the image, an eliminating area (the hatched area in FIG. 14A) is set to an area where the center pixel of the matching area may exist when the linear edge ed1 is included in the matching area on the basis of the vertical width of the matching area set when a motion vector is detected by the tracking processor 16.

Figure 14B:
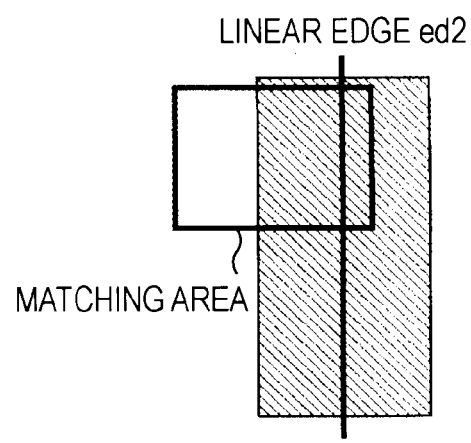

Similarly, for example, as shown in FIG. 14B, when a vertical linear edge ed2 is detected in the image, an eliminating area (the hatched area in FIG. 14B) is set to an area where the center pixel of the matching area may exist when the linear edge ed2 is included in the matching area on the basis of the horizontal width of the matching area set when a motion vector is detected by the tracking processor 16.

Although not shown in the drawing, similarly, when an oblique linear edge is detected in the image, an eliminating area is set to an area where the center pixel of the matching area may exist when the detected linear edge is included in the matching area on the basis of the size of the matching area set when a motion vector is detected by the tracking processor 16.

Figure 14C:
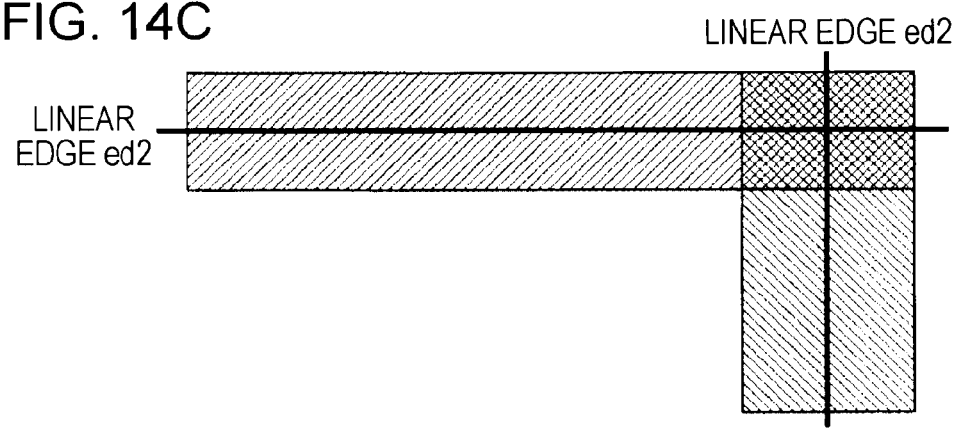
Figure 14D:
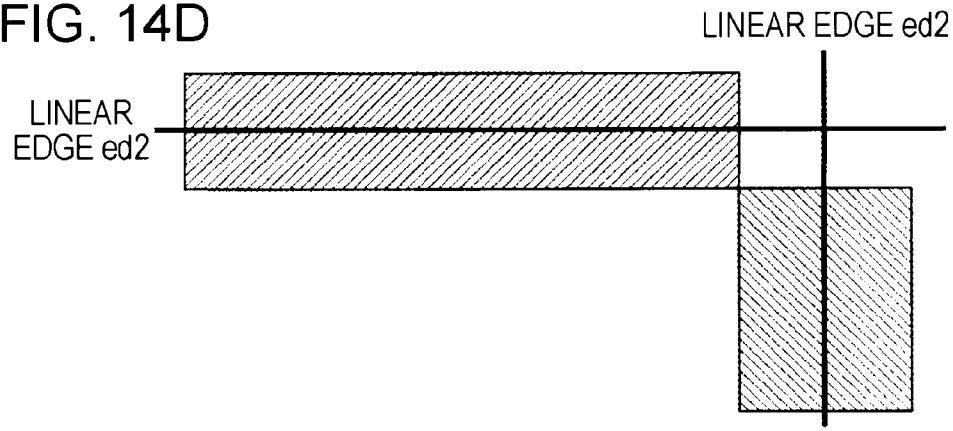

For example, as shown in FIG. 14C, when a plurality of linear edges is detected in the image, an area where eliminating areas corresponding to the linear edges overlap is formed. This overlapping area, however, is not included in the eliminating area. In other words, as shown in FIG. 14D, when a plurality of linear edges is detected in the image, an eliminating area is set excluding the overlapping area.

Figure 15:
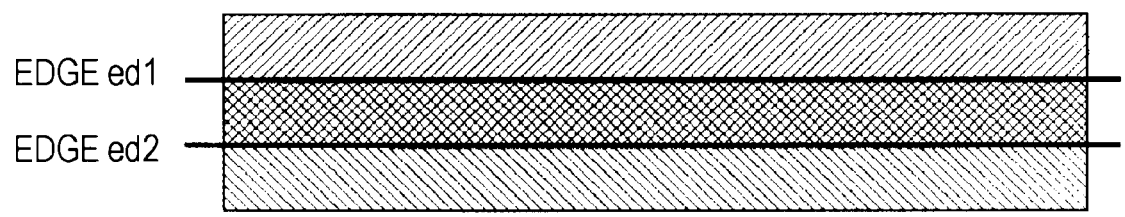
FIG. 15 illustrates an eliminating area set to correspond to linear edges.

For example, as shown in FIG. 15, when a plurality of parallel linear edges is detected in the image, an area where eliminating areas corresponding to the linear edges overlap is included in the eliminating area.

Figure 16:
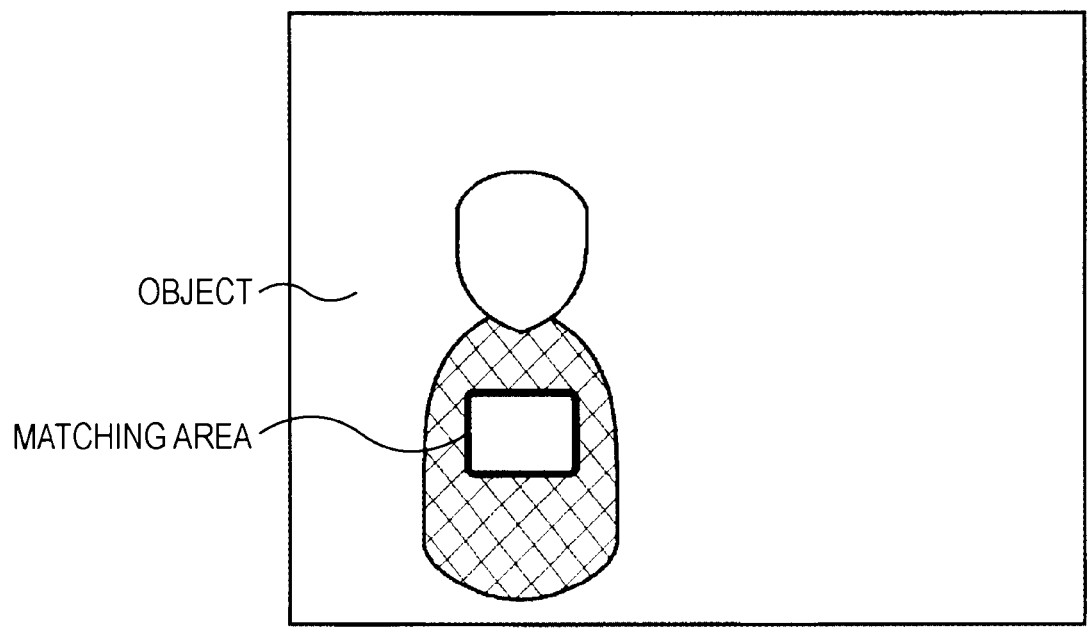
FIG. 16 illustrates a case in which a repeating pattern is present in an object.
Figure 17:
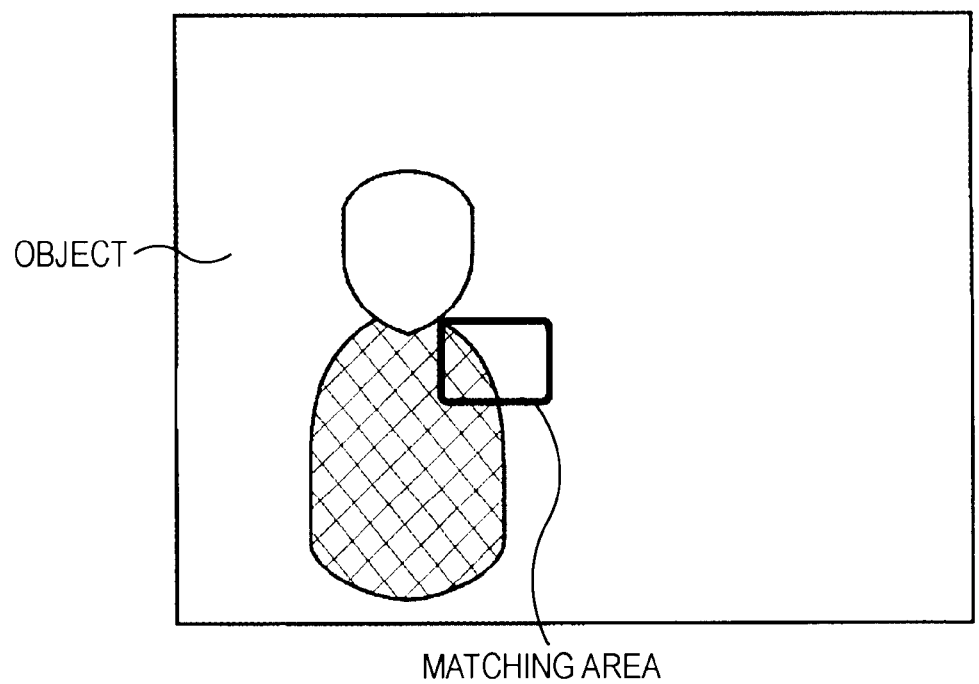
FIG. 17 illustrates a case in which a repeating pattern is present in an object.

For a repeating pattern, as shown in FIG. 16, an eliminating area is set to an area where a center pixel of the matching area may exist when a repeating pattern is included in the entire matching area. In other words, as shown in FIG. 17, an area where the center pixel of the matching area may exist when a repeating pattern is included in part of the matching area is not set to an eliminating area.

Referring back to FIG. 3, the tracking processor 16 includes the moving-object detector 17 and the tracking-point estimator 18.

The moving-object detector 17 detects an object in an area excluding an eliminating area in an image of an image signal input from an upstream unit, estimates the area including the detected object, and detects the motion vector of a target point set in the estimated area. The motion vector, however, is not calculated when the center pixel of the matching area is not in the eliminating area.

The tracking-point estimator 18 estimates the movement of the target point (the position of the target point in the next frame) on the basis of the motion vector detected by the moving-object detector 17. When, however, the center pixel of the matching area set for this estimation is positioned inside the eliminating area, the detected motion is often not accurate. Therefore, the target point is changed to another predetermined candidate. Then again, it is determined whether or not the center pixel of the matching area corresponding to the predetermined candidate is positioned inside the eliminating area. The target point is changed to other candidates until it is determined that the center pixel of the matching area corresponding to the candidate is positioned inside the eliminating area. The target point may be changed to another candidate according to a method described in, for example, Japanese Unexamined Patent Application Publication No. 2005-303983.

When a search area set for the target point estimation overlaps with the eliminating area, the center of the matching area including the estimated destination of the target point is positioned inside the eliminating area. Therefore, the movement of the target point may be inaccurately estimated in the next frame. For stable and continuous tracking of the target point, the target point is changed to another predetermined candidate. In such case also, the target point is changed to other candidates until it is determined that the center pixel of the matching area corresponding to the predetermined candidate is not positioned inside the eliminating area.

An object tracking process carried out by the object tracking device 10 will be described with reference to the flow chart shown in FIG. 18. The object tracking process starts in response to an image signal supplied to the object tracking device 10.

In Step S1, the black-bar detector 12 of the eliminating-area detector 11 detects black bars in the image and sends the positions of the borders of the detected black bars and the actual image to the eliminating-area setting unit 15.

The process carried out by the black-bar detector 12 in Step S1 (hereinafter referred to as "black-bar detection process") will be described in detail with reference to FIG. 19.

In Step S101, the low-luminance-range detector 21 of the black-bar detector 12 sequentially processes frames of the image signal input from an upstream unit and detects the low-luminance ranges in the frame being processed.

Figure 20:
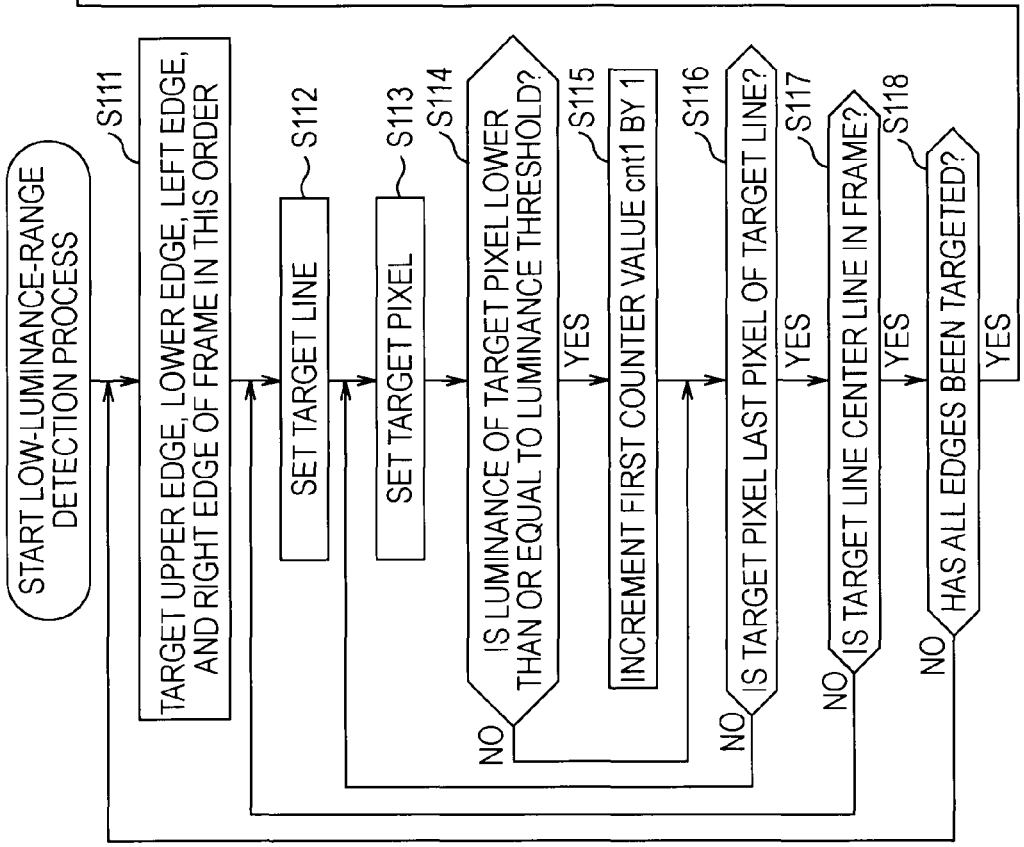
FIG. 20 is a flow chart illustrating in detail Step in FIG. 19.

The low-luminance-range detection process in Step S101 will be described in detail with reference to the flow chart shown in FIG. 20.

The low-luminance-range detection process is carried out in sequence on the frames of the image signal input from an upstream unit. In Step S111, the low-luminance-range detector 21 sequentially targets the upper edge, lower edge, left edge, and right edge of the target frame. In Step S112, the low-luminance-range detector 21 sequentially sets each line from the target edge toward the center of the frame as the target line. In step S113, each pixel in the target line is sequentially set as the target pixel, as shown in FIG. 6.

In Step S114, the low-luminance-range detector 21 determines whether or not the luminance of the target pixel is lower than or equal to a predetermined luminance threshold. When it is determined that the luminance of the target pixel is lower than or equal to the luminance threshold, the process proceeds to Step S115 to increment by one a first counter value cnt1 indicating the number of pixels in the target line having a luminance lower than or equal to the luminance threshold.

In Step S114, when the luminance of the target pixel is determined to not be lower than or equal to the luminance threshold, the process in Step S115 is skipped.

In Step S116, the low-luminance-range detector 21 determines whether or not the current target pixel is the last pixel (the pixel at the end) of the target line. When it is determined that the current target pixel is not the last pixel of the target line, the process is returned to Step S113, and the subsequent process is repeated. Then, in Step S116, when it is determined that the current target pixel is the last pixel of the target line, the process proceeds to Step S117.

In Step S117, the low-luminance-range detector 21 determines whether or not the current target line is the center line of the frame. When it is determined that the target line is not the center line of the frame, the process is returned to Step S112, and the subsequent process is repeated. Then, in Step S117, when it is determined that the current target line is the center line of the frame, the process proceeds to Step S118.

In Step S118, the low-luminance-range detector 21 determines whether or not all of the upper, lower, left, and right edges have been targeted in the target frame. When any of the edges has not been targeted, the process is returned to Step S111, and the subsequent process is repeated. Then, in Step S118, when it is determined that all of the upper, lower, left, and right edges have been targeted, the process proceeds to Step S119. At this point, all of the lines in the frame to be processed have been target line, and the first counter value cnt1 corresponding to each target line has been count.

In Step S119, the low-luminance-range detector 21 sequentially targets the upper edge, lower edge, left edge, and right edge of the target frame and then, in Step S120, sequentially sets each line as the target line from the targeted edge toward the center of the frame.

In Step S121, the low-luminance-range detector 21 determines whether or not the first counter value cnt1 corresponding to the target line is larger than or equal to the first threshold. When it is determined that the first counter value cnt1 corresponding to the target line is larger than or equal to the first threshold, the process proceeds to Step S122, and a low-luminance-range flag corresponding to the target line is set to "1".

In Step S121, when the first counter value cnt1 corresponding to the target line is determined not to be larger than or equal to the first threshold, the low-luminance-range detector 21 sets the low-luminance-range flag corresponding to the target line to "0", and the process in Step S122 is skipped.

In Step S123, the low-luminance-range detector 21 determines whether or not the current target line is the center line of the frame. When it is determined that the target line is not the center line of the frame, the process is returned to Step S120, and the subsequent process is repeated. Then, in Step S123, when it is determined that the current target line is the center line of the frame, the process proceeds to Step S124.

In Step S124, the low-luminance-range detector 21 determines whether or not all of the upper, lower, left, and right edges have been targeted in the target frame. When any of the edges has not been targeted, the process is returned to Step S119, and the subsequent process is repeated. Then, in Step S124, when it is determined that all of the upper, lower, left, and right edges have been targeted, the low-luminance-range detection process is completed.

As described above, whether or not each line of the frame to be processed is included in the low-luminance range is determined. The result of the determination is set as a low-luminance line flag. The process is returned to Step S102 in FIG. 19.

Referring back to FIG. 19, in Step S102, the border-candidate detector 22 sequentially processes each frame of the image signal input from an upstream unit and detects the border candidates in the low-luminance ranges detected by the low-luminance-range detector 21 at the edges (upper, lower, left, and right) of the frame to be processed. The border-candidate detection process in Step S102 will be described in detail with reference to the flow chart in FIG. 21.

The border-candidate detection process is similar to the low-luminance-range detection process in that each frame of the image signal input from an upstream unit is sequentially processed. In Step S131, the border-candidate detector 22 sequentially targets the detected low-luminance ranges at the upper edge, lower edge, left edge, and right edge of the target frame and then, in Step S132, sequentially sets each line as the target line and adjacent line from the edge of the low-luminance range toward the center of the frame. Then, in Step S133, the border-candidate detector 22 sequentially sets the pixels on the target line as target pixels.

In Step S134, the border-candidate detector 22 calculates the absolute difference of the luminance of the target pixel and the luminance of the adjacent pixel and determines whether or not the calculated absolute difference of the luminance is larger than or equal to a predetermined difference threshold. When it is determined that the calculated absolute difference of the luminance is larger than or equal to a predetermined difference threshold, the process proceeds to Step S135 to increment by one a second counter value cnt2 indicating the number of pixels in the target line having an absolute difference with the adjacent pixel that is larger than or equal to the difference threshold.

In Step S134, when it is determined that the calculated absolute difference of the luminance is not larger than or equal to the difference threshold, the process in Step S135 is skipped.

In Step S136, the border-candidate detector 22 determines whether or not the current target pixel is the last pixel (the pixel at the end) of the target line. When it is determined that the current target pixel is not the last pixel of the target line, the process is returned to Step S133, and the subsequent process is repeated. Then, in Step S136, when it is determined that the current target pixel is the last pixel of the target line, the process proceeds to Step S137.

In Step S137, the border-candidate detector 22 determines whether or not the current target line is the edge line closer to the center of the frame of the target low-luminance range. When it is determined that the target line is not the edge line closer to the center of the frame, the process is returned to Step S132, and the subsequent process is repeated. Then, in Step S137, when it is determined that the current target line is the edge line closer to the center of the frame, the process proceeds to Step S138.

In Step S138, the border-candidate detector 22 determines whether or not all of the upper, lower, left, and right edges have been targeted in the target frame. When any of the edges has not been targeted, the process is returned to Step S131, and the subsequent process is repeated. Then, in Step S138, when it is determined that all of the upper, lower, left, and right edges have been targeted, the process proceeds to Step S139. At this point, all of the lines in the frame to be processed have been target line, and the second counter value cnt2 corresponding to each target line has been count.

In Step S139, the border-candidate detector 22 sequentially targets the low-luminance ranges detected at the upper edge, lower edge, left edge, and right edge of the target frame and then, in Step S140, sequentially sets each line as the target line from the edge of the target low-luminance range toward the center of the frame.

In Step S141, the border-candidate detector 22 determines whether or not the second counter value cnt2 corresponding to the target line that is larger than or equal to the predetermined second threshold. When it is determined that the second counter value cnt2 corresponding to the target line is larger than or equal to the second threshold, the process proceeds to Step S142, and the target line is set to a border candidate (the candidate of the border of the black bar and the actual image).

In Step S141, when the second counter value cnt2 corresponding to the target line is determined not to be larger than or equal to the second threshold, the process in Step S142 is skipped.

In Step S143, the border-candidate detector 22 determines whether or not the current target line is the edge line closer to the center of the frame in the target low-luminance range. When it is determined that the target line is not the edge line at the center of the frame in the target low-luminance range, the process is returned to Step S140, and the subsequent process is repeated. Then, in Step S143, when it is determined that the current target line is the edge line closer to the center of the frame in the target low-luminance range, the process proceeds to Step S144.

In Step S144, the border-candidate detector 22 determines whether or not all of the low-luminance ranges detected at the upper, lower, left, and right edges have been targeted. When any of the low-luminance ranges has not been targeted, the process is returned to Step S139, and the subsequent process is repeated. Then, in Step S144, when it is determined that all of the low-luminance ranges at the upper, lower, left, and right edges have been targeted, the low-luminance-range detection process is completed.

As described above, it is determined whether or not each line in a low-luminance range detected in the frame to be processed is a border candidate. The result of the determination is supplied to the integration identifying unit 23, and process is returned to the Step S103 in FIG. 19.

Figure 22:
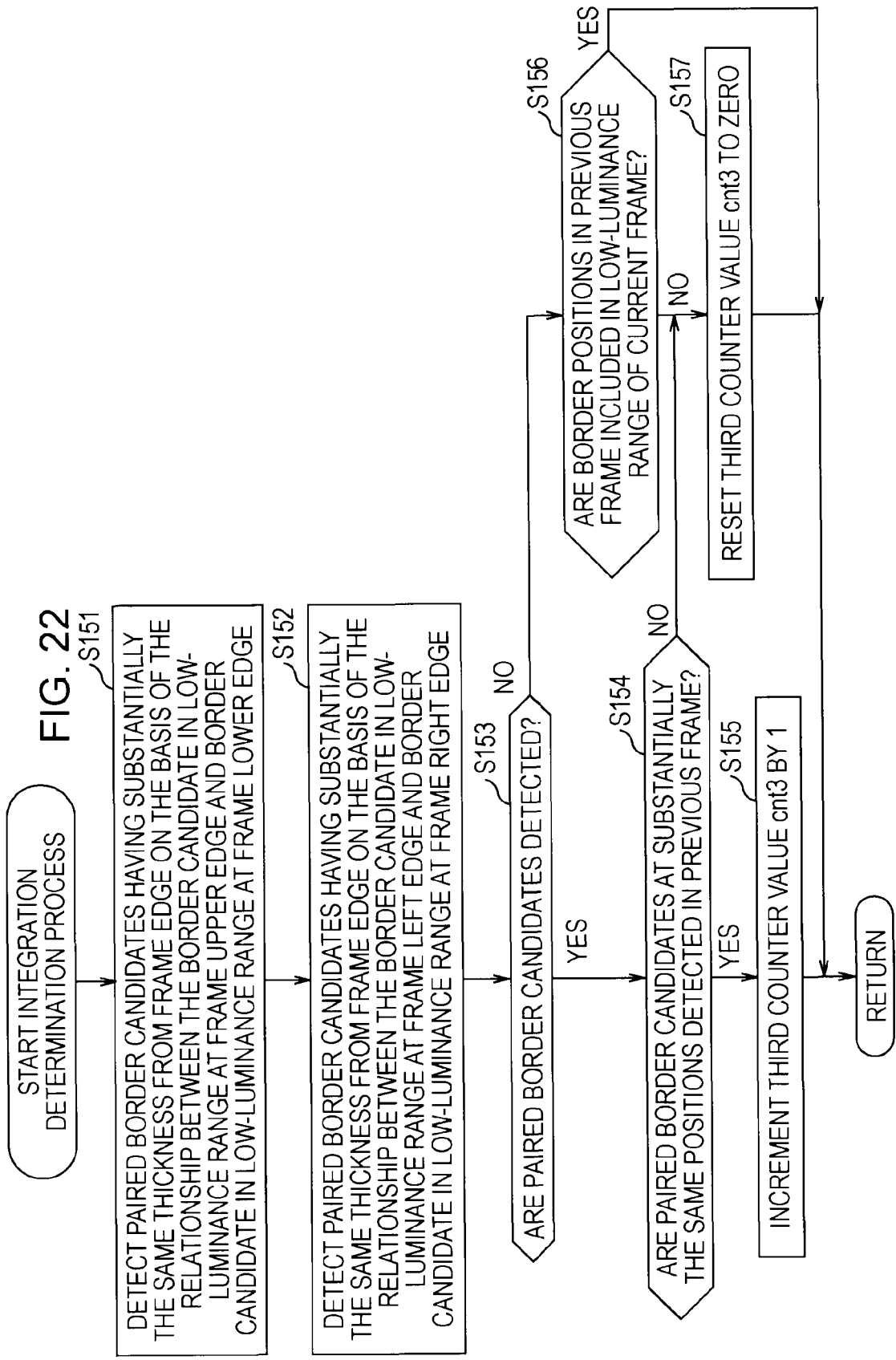
FIG. 22 is a flow chart illustrating in detail Step in FIG. 19.

Referring back to FIG. 19, the integration identifying unit 23 identifies the positions of the borders in each frame on the basis of the low-luminance ranges detected by the low-luminance-range detector 21 and the border candidates detected by the border-candidate detector 22. The integration identification process in Step S103 will be described with reference to the flow chart shown in FIG. 22.

The low-luminance-range detection process is carried out for each frame of the image signal. In Step S151, among the border candidates detected by the border-candidate detector 22, the integration identifying unit 23 compares the border candidate of the low-luminance range detected at the upper side of the frame and the border candidate of the low-luminance range detected at the lower side of the frame and detects a combination of border candidates (hereinafter referred to as "border candidate pair") having substantially the same thickness (i.e., the thickness of the black bar at the upper side and the thickness of the black bar at the lower side are substantially the same). When a low-luminance range is not detected and/or when a border candidate is not detected, Step S151 can be skipped.

In Step S152, among the border candidates detected by the border-candidate detector 22, the integration identifying unit 23 compares the border candidate of the low-luminance range detected at the left side of the frame and the border candidate of the low-luminance range detected at the right side of the frame and detects a combination of border candidates (hereinafter referred to as "border candidate pair") having substantially the same thickness (i.e., the thickness of the black bar at the upper side and the thickness of the black bar at the lower side are substantially the same). When a low-luminance range is not detected and/or when a border candidate is not detected, Step S152 can be skipped.

In Step S153, the integration identifying unit 23 determines whether or not a border candidate pair is detected in at least one of Steps S151 and S152. When black bars are included in the image signal, usually they are provided at the upper and lower edges or the left and right edges of the frame. Thus, a border candidate pair is detected in the process of Step S151 or S152. In Step S153, when it is determined that a border candidate pair has been detected in the process of Step S151 or S152, the process proceeds to Step S154. In Step S154, the integration identifying unit 23 determines whether or not a border candidate pair has been detected in the previous frame at substantially the same position as the border candidate pair detected in the current frame. When it is determined that border candidate pair has been detected, the process proceeds to Step S155.

In Step S155, the integration identifying unit 23 increments by one a third counter value cnt3 indicating the continuity over time of the detected border candidate pair. Then, the integration identification process is completed.

In Step S154, when it is determined that a border candidate pair has not been detected in the previous frame at substantially the same position as the border candidate pair detected in the current frame, the process proceeds to Step S157.

In Step S157, the integration identifying unit 23 initializes the third counter value cnt3, which indicates the continuity over time of the detected border candidate pair, to zero. Then, the integration identification process is completed.

In Step S153, when it is determined that a border candidate pair has not been detected in the processes in Step S151 and S152, the process proceeds to Step S156. In Step S156, the integration identifying unit 23 determines whether or not the border positions in the previous frame are included in the low-luminance ranges of the current frame. When it is determined that the border positions are included, the integration identification process is completed while maintaining the third counter value cnt3. In Step S156, when it is determined that the border positions in the previous frame are not included in the low-luminance ranges of the current frame, the process proceeds to Step S157, and the third counter value cnt3 is initialized to zero. Then, the integration identification process is completed.

Figure 19:
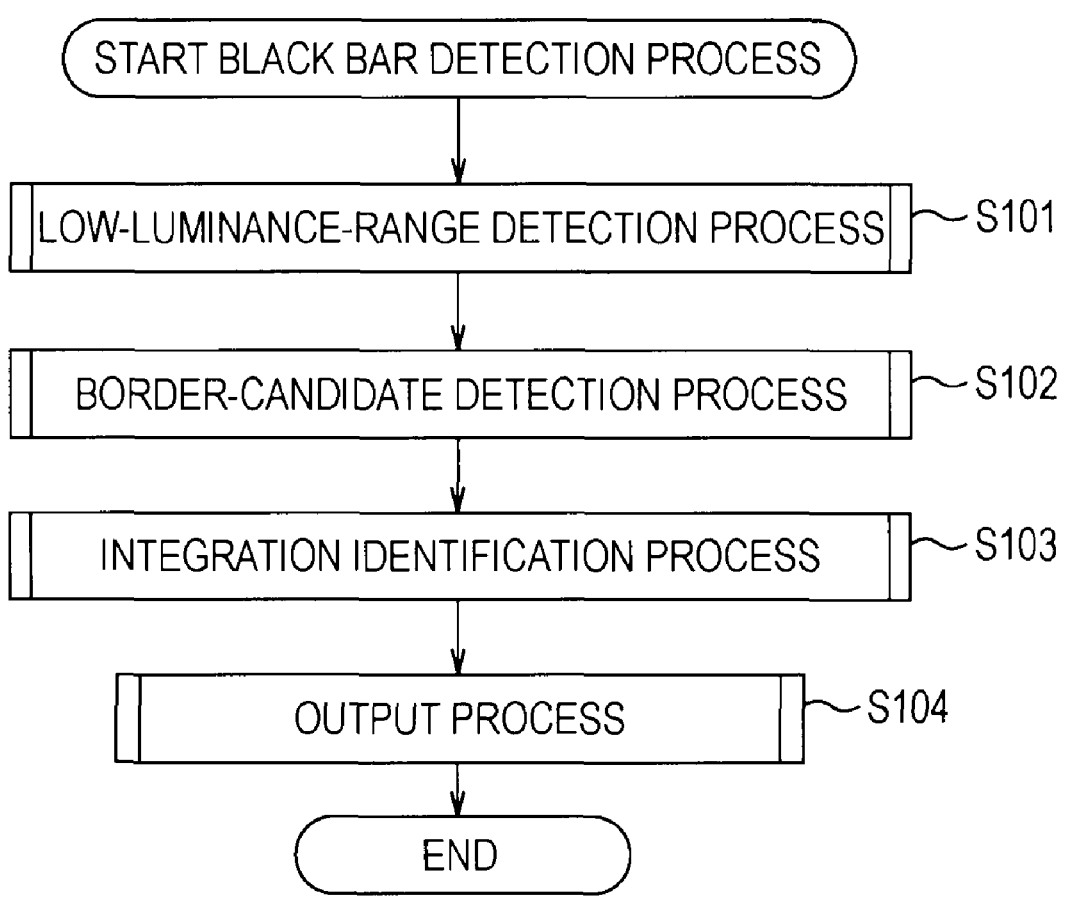
FIG. 19 is a flow chart illustrating in detail Step S1 in FIG. 18.

As described above, after the third counter value cnt3 indicating the continuity over time of the detected border candidate pair is incremented, initialized to zero, or maintained, the process is returned to Step S104 in FIG. 19.

Figure 23:
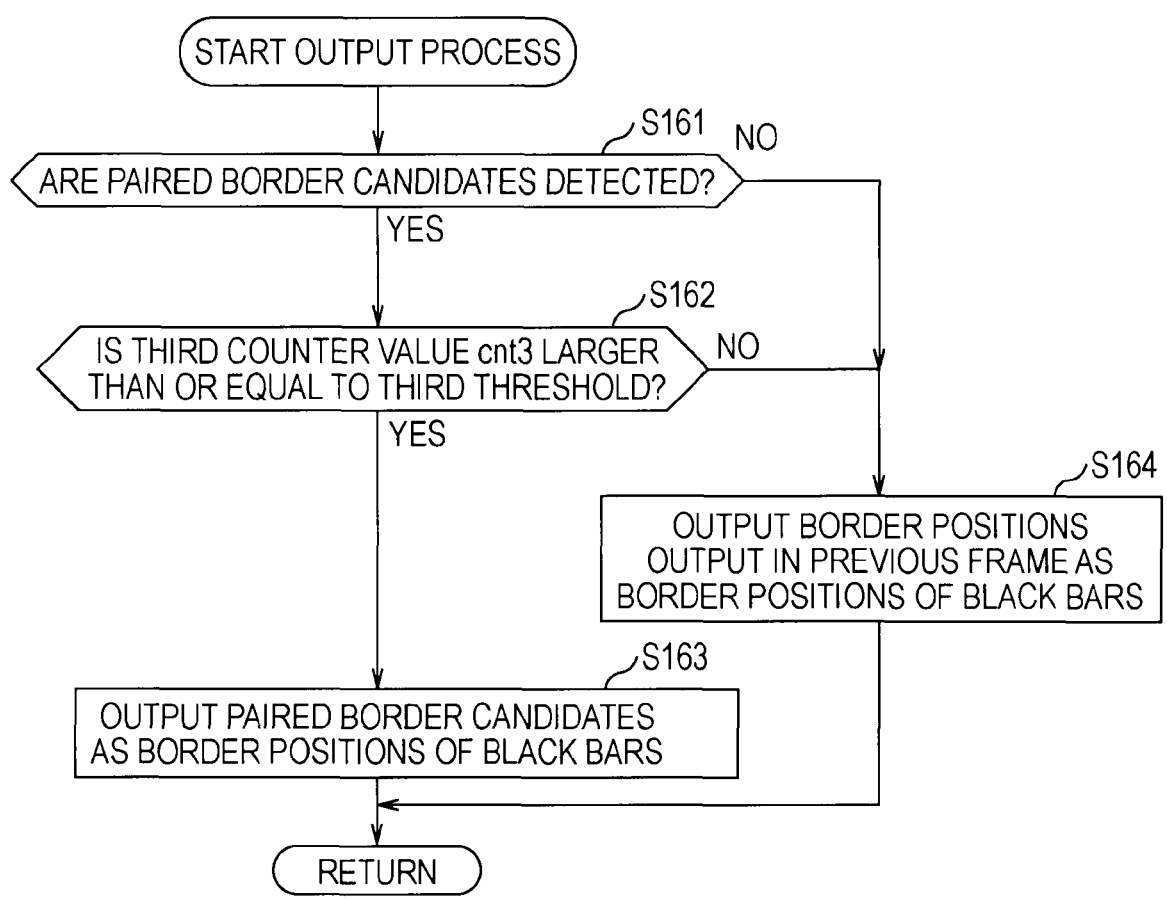
FIG. 23 is a flow chart illustrating in detail Step S104 in FIG. 19.

Referring back to FIG. 19, in Step S104, the output processor 25 determines the positions of the borders in each frame on the basis of the third counter value cnt3, set by the integration identifying unit 23, indicating the continuity over time of the detected border candidate pair, and outputs these positions to a downstream unit. The output process in Step S104 will be described in detail with reference to the flow chart in FIG. 23.

In Step S161, the output processor 25 determines whether or not a border candidate pair is detected in the current frame by the integration identifying unit 23. When it is determined that a border candidate pair is detected, the process proceeds to S162. In Step S162, the output processor 25 determines whether or not the third counter value cnt3 corresponding to the detected border candidate pair is larger than or equal to a predetermined third threshold. When it is determined that the third counter value cnt3 is larger than or equal to the third threshold, the process proceeds to Step S163.

In Step S163, the output processor 25 sends the position of the border candidate pair detected in the current frame as the position of the border to the eliminating-area setting unit 15.

In Step S161, when the integration identifying unit 23 determines that a border candidate pair is not detected in the current frame or, in Step S162, when it is determined that the third counter value cnt3 corresponding to the detected border candidate pair is not larger than or equal to the third threshold, the process proceeds to Step S164.

In Step S164, the output processor 25 sends the position of the border output in the previous frame as the position of the border in the current frame to the eliminating-area setting unit 15.

As described above, through the output process, when a border candidate pair is detected in the current frame and when the detected border candidate pair has continuity over time, the border is detected, and its position is notified to the eliminating-area setting unit 15. Alternately, when a border candidate pair is not detected in the current frame and/or when a detected border candidate pair does not have continuity over time, the position of the border in the previous frame is notified to the eliminating-area setting unit 15. Accordingly, the black-bar detection process is completed.

An example of a border position corresponding to each frame of the image signal output through the above-described black-bar detection process will be described with reference to FIGS. 24 to 27.

FIG. 24 illustrates the transition of an image signal containing black bars provided at the upper and lower edges of a frame, where the exemplary number of pixels in the longitudinal direction of the frame is 240.

In other words, low-luminance ranges having a thickness of 20 pixels are provided at the upper and lower edges of the frame up to frame f0, and only the edges closer to the center of the frame are detected as border candidates. In frame f1, low-luminance ranges having a thickness of 20 pixels are present at the upper and lower edges, and a plurality of border candidates corresponding to the subtitles in the low-luminance ranges is detected not only at the edges closer to the center of the frame. In frame f2, the entire image is a low-luminance range, and a border candidate is detected.

As shown in FIG. 24, when the image signal transits, in the frame f0, the detected position of the border candidate pair at the upper and lower edges of the frame, i.e., the positions 20 pixels from the upper and lower edges, is notified as the border positions. In frame f1, although the border candidate at the upper edge increases, there is only one border candidate pair having continuity over time. Therefore, the positions 20 pixels from the upper and lower edges continue to be notified as the border positions. In frame f2, although border candidates are not detected, border positions (positions 20 pixels from the upper and lower edges of the frame) output in response to the previous frame f1 are included in the detected low-luminance range. Therefore, the border positions (positions 20 pixels from the upper and lower edges of the frame) are sent out.

FIGS. 25 to 27 illustrate information about the upper edge side, among the transition of the image signal containing black bars provided at the upper and lower edges of a frame. In FIGS. 25 to 27, the third threshold compared with the third counter value is 7.

FIG. 25 illustrates an example (frames f0 to f11 (different from the frame f0 to f2 in FIG. 24)) immediately after the black-bar detection process is started. In the case illustrated in the drawing, in frames f0 to f6, although the position 20 pixels from the upper edge is detected as a border position, since there is no continuity over time, the border position is not sent to frame f6. Then, in frame f7 and the subsequent frames, it is determined that the detected border position has continuity over time (i.e., the third counter value is larger than or equal to the third threshold value), and the detected border position (the position 20 pixels from the upper edge) is sent out.

FIG. 26 illustrates an exemplary case in which the luminance of the entire image is low because of a dark scene. In the drawing, although the luminance of the entire image decreases in frame f103 and the subsequent frames, the low-luminance range is expanded to a position 119 pixels from the upper edge, and the border position is not detected, the border position (a position 20 pixels from the upper edge of the frame) sent out in response to frame f102 in the previous frame is included in the detected low-luminance range. Therefore, the border position (the position 20 pixels from the upper edge of the frame) sent out in response to frame f102 is sent out.

FIG. 27 illustrates an exemplary case in which a screen is switched from a movie having black bars to a commercial not having black bars. In the drawing, the low-luminance range disappears in frame f203 and the subsequent frames. Since a border candidate pair is not detected in frame f203, the third counter value is initialized to zero. In frames f203 to f209, however, the new border position (the position zero pixels from the upper edge) does not have continuity over time. Therefore, the border position (the position 20 pixels from the upper edge) sent out in response to frame f202 is sent out. Then, in frame f210 and the subsequent frames, it is determined that the detected border position has continuity over time (the third counter value is larger than or equal to the third threshold value), and the detected border position (the position zero pixels from the upper edge) is sent out.

According to the above-described black-bar detection process, when there is noise in the image signal and when the black bars include subtitles and telops, the borders of the black bars can be detected at high accuracy. Even when a scene that makes the entire image dark is included in the middle of the image signal, the borders of the black bars can be detected at high accuracy.

Figure 18:
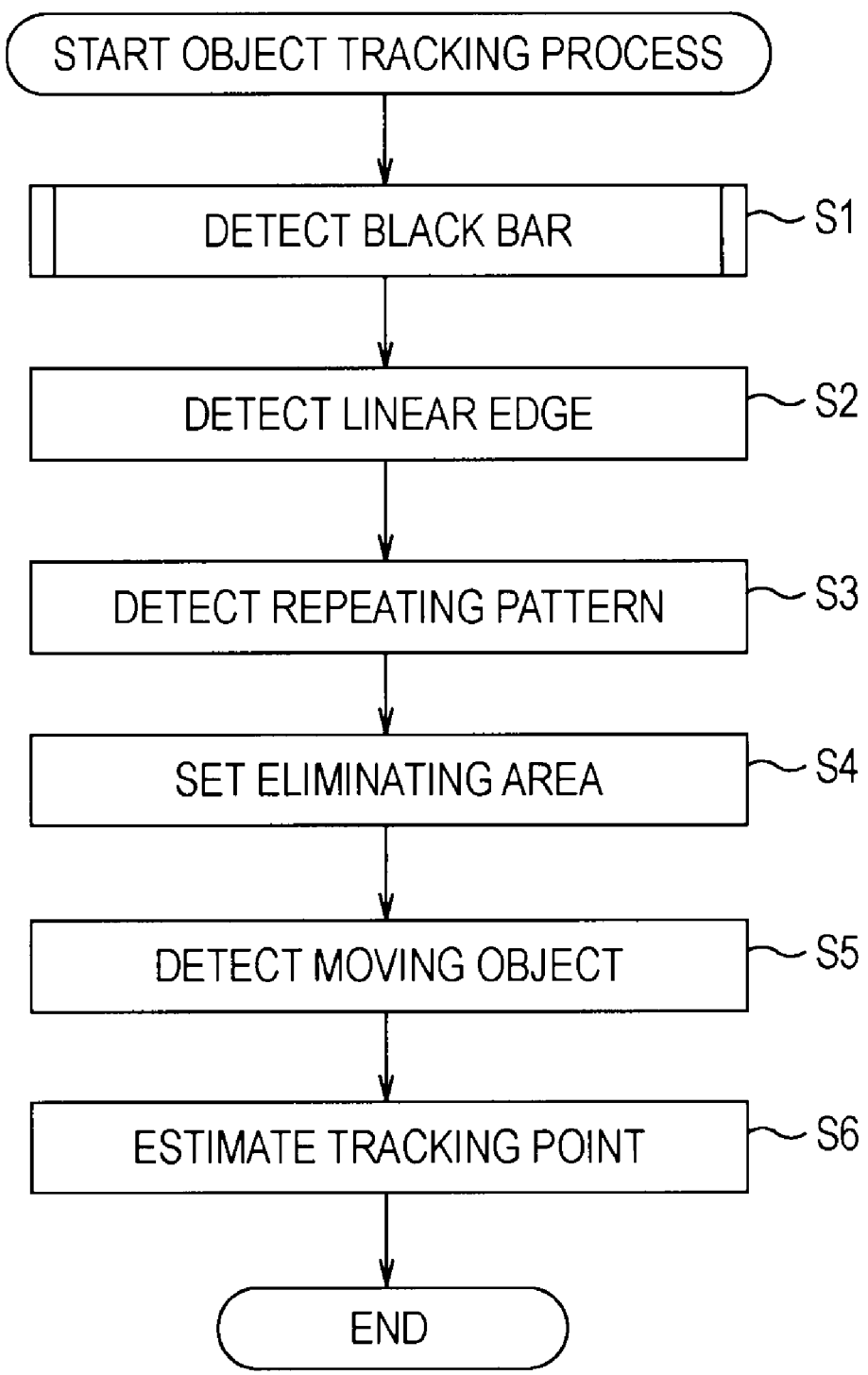
FIG. 18 is a flow chart illustrating an object tracking process.

As described above, the border positions of the black bars are sent to the eliminating-area setting unit 15, and the process is returned to FIG. 18. In Step S2, the linear-edge detector 13 detects linear edges in the image and sends positional information about the detected linear edges to the eliminating-area setting unit 15. As described above, the detected linear edges include output lines of PinP, frames surrounding telops, and outlines of OSD in the image.

In Step S3, the repeating-pattern detector 14 detects linear edges in the image and sends positional information about the detected repeating pattern to the eliminating-area setting unit 15.

The processes in Steps S1 to S3 are described as being carried out in the order of Steps S1, S2, and S3. However, the order of the processes may be changed, or the processes may be carried out simultaneously.

In Step S4, the eliminating-area setting unit 15 sets the eliminating areas on the basis of positional information about (the borders) of the black bars sent from the black-bar detector 12, the positional information about the linear edges sent from the linear-edge detector 13, and the positional information about the repeating patterns sent from the repeating-pattern detector 14. Then, the eliminating-area setting unit 15 sends information about the eliminating areas to the moving-object detector 17 and the tracking-point estimator 18.

In Step S5, the moving-object detector 17 of the tracking processor 16 detects an object in the image of the image signal input from an upstream unit, estimates the area including the detected object, sets a tracking point in the estimated area, and detects the motion vector of the tracking point. The motion vector is not calculated when the center pixel of the matching area provided for motion vector detection is positioned inside the eliminating areas sent from the eliminating-area setting unit 15.

In Step S6, the tracking-point estimator 18 of the tracking processor 16 estimates the movement of the tracking point (the position of the tracking point in the next frame) on the basis of the motion vector detected by the moving-object detector 17 and outputs the result of the estimation as positional information about the moving object to a downstream unit.

When the center pixel of the matching area set for the estimation is positioned in the eliminating area, the tracking point is changed to another predetermined candidate. Then again, it is determined whether or not the center pixel in the matching area corresponding to the new tracking point is positioned in the eliminating area. The target point is changed to another candidate until it is determined that the center pixel of the matching area corresponding to the candidate is not positioned inside the eliminating area.

When the search area set for estimating the tracking point overlaps with the eliminating area, the tracking-point estimator 18 changes the target point to other predetermined candidate. In such case also, the target point is changed to another candidate until it is determined that the center pixel of the matching area corresponding to the candidate is not positioned inside the eliminating area. The description of the object tracking process completed.

Through the above-described object tracking process by the object tracking device 10, the black bars in the image can be accurately detected. Since the detected black bars can be accurately eliminated from the matching area set for block matching, the motion vector can be accurately detected. As a result, the moving object can be accurately tracked.

The linear edges and repeating patterns in the image can also be detected. Thus, the detected linear edges and repeating patterns can be accurately eliminated from the matching area for block matching. Therefore, the motion vector can be accurately detected, and, as result, the moving object can be accurately tracked.

The present invention may be applied to electronic equipment configured to process image signals, such as video players, video recorders, television tuners, and television receiver.

The series of processes described above may be executed by hardware or software. To execute the series of processes by software, the program constituting the software is installed from a program recording medium to a computer included in specialized hardware or a general-purpose personal computer capable of performing various function by installing various programs.

The program executed by a computer may be a program time-sequentially processed in the order described in the embodiments of the present invention, may be programs processed simultaneously, or may be a program processed at a timing corresponding to a calling.

The program may be processed by one computer or may be processed by distributed-processing performed by a plurality of computers. The program may be executed after being transferred to a remote computer.

The embodiments of the present invention are not limited those described above and may be modified in various ways within the scope of the present invention.

The present application contains subject matter related to that disclosed in Japanese Priority Patent Application JP 2008-068809 filed in the Japan Patent Office on Mar. 18, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image-signal processing apparatus comprising:
   a setting unit configured to set an eliminating area based on a black bar in an image constituting a moving image, the setting unit including:
      a black-bar detecting unit configured to detect the black bar in the image based on a low-luminance range in the lines of the image and a border candidate, the border candidate being determined based on an absolute difference of a luminance value between each of a plurality of pixels of the border candidate and pixels of an adjacent line;
      a motion-vector detecting unit configured to detect an object in the image constituting a moving image and detect a motion vector corresponding to the object using an area excluding the eliminating area in the image; and
      an estimating unit configured to estimate a position to which the object moves on the basis of the detected motion vector.

2. The image-signal processing apparatus according to claim 1, wherein the motion-vector detecting unit detects the object from the area excluding the eliminating area in the image constituting a moving image and detects the motion vector corresponding to the object using the area excluding the eliminating area in the image.

3. The image-signal processing apparatus according to claim 2, wherein the estimating unit estimates the position to which the object moves on the basis of the detected motion vector in the area excluding the eliminating area.

4. The image-signal processing apparatus according to claim 2,
   wherein the setting unit further includes
      a linear edge detecting unit configured to detect a linear edge in the image,
      a repeating pattern detecting unit configured to detect a repeating pattern in the image, and
      an eliminating-area determining unit configured to determine the eliminating area on the basis of the detected black bar, the detected linear edge, and the detected repeating pattern.

5. The image-signal processing apparatus according to claim 1,
   wherein the black-bar detecting unit includes
      a first detecting unit configured to detect the low-luminance range,
      a second detecting unit configured to detect the border candidate of the black bar in the detected low-luminance range, and
      an identifying unit configured to identify a border of the black bar on the basis of the detected low-luminance range and the detected border candidate.

6. An image-signal processing method for an image-signal processing apparatus configured to track an object moving in an image, the method comprising the steps of:
   setting an eliminating area in an image constituting a moving image by detecting a black bar in the image based on a low-luminance range in the lines of the image and a border candidate, the border candidate being determined based on an absolute difference of a luminance value between each of a plurality of pixels of the border candidate and pixels of an adjacent line;
   detecting an object in the image constituting a moving image and detecting a motion vector corresponding to the object using an area excluding the eliminating area in the image; and
   estimating a position to which the object moves on the basis of the detected motion vector.

7. A non-transitory computer readable medium having computer readable instructions thereon that when executed by a computer cause the computer to perform a method for tracking an object moving in an image comprising:
   setting an eliminating area in an image constituting a moving image by detecting a black bar in the image based on a low-luminance range in the lines of the image and a border candidate, the border candidate being determined based on an absolute difference of a luminance value between each of a plurality of pixels of the border candidate and pixels of an adjacent line;
   detecting an object in the image constituting a moving image and detecting a motion vector corresponding to the object using an area excluding the eliminating area in the image; and
   estimating a position to which the object moves on the basis of the detected motion vector.

8. An image-signal processing apparatus for tracking an object moving in an image, comprising:
   black-bar detecting means for detecting a black bar in the image based on a low-luminance range in the lines of the image and a border candidate, the border candidate being determined based on an absolute difference of a luminance value between each of a plurality of pixels of the border candidate and pixels of an adjacent line;
   setting means for setting an eliminating area based on said black bar in an image constituting a moving image;
   a motion-vector detecting means for detecting an object in the image constituting a moving image and detecting a motion vector corresponding to the object using an area excluding the eliminating area in the image; and
   estimating means for estimating a position to which the object moves on the basis of the detected motion vector.

9. The image-signal processing apparatus according to claim 1, wherein the eliminating area is set to an area where a center pixel of a matching area exists when a pixel associated with the matching area overlaps with the black bar.

10. The image-signal processing apparatus according to claim 5, wherein the identifying unit identifies the border of the black bar based further on a position of the border candidate in the image and a continuity over time of the border candidate.

11. The image-signal processing apparatus according to claim 1, wherein the determination of the border candidate is based on the absolute difference of the luminance value being more than a threshold, the threshold being based on the border candidate being at the top, bottom, left, or right of the image.

* * * * *